United States Patent
Moon et al.

(10) Patent No.: US 7,386,318 B2
(45) Date of Patent: Jun. 10, 2008

(54) LOCATION BASED SERVICE PROVIDER

(75) Inventors: George Christopher Moon, Aurora (CA); Xiang Li, Scarborough (CA); Scott Petronis, Rexford (CA); Arthur R. Berrill, Goodwood (CA); Matthew W. Tweedie, Delmar, NY (US); John L. Dove, East Greenbush, NY (US); Edward T. Dewald, East Greenbush, NY (US)

(73) Assignee: Pitney Bowes MapInfo Corporation, Troy, NY (US)

( * ) Notice: Subject to any disclaimer, the term of this patent is extended or adjusted under 35 U.S.C. 154(b) by 525 days.

(21) Appl. No.: 10/392,370

(22) Filed: Mar. 19, 2003

(65) Prior Publication Data

US 2004/0023666 A1 Feb. 5, 2004

Related U.S. Application Data

(60) Provisional application No. 60/365,820, filed on Mar. 19, 2002, provisional application No. 60/378,805, filed on May 7, 2002, provisional application No. 60/411,435, filed on Sep. 17, 2002.

(51) Int. Cl.
*H04Q 7/20* (2006.01)
(52) U.S. Cl. ............................... 455/456.3; 455/414.1; 455/456.2
(58) Field of Classification Search ............. 455/456.3, 455/456.1, 414.1, 414.3
See application file for complete search history.

(56) References Cited

U.S. PATENT DOCUMENTS 6,944,447 B2 * 9/2005 Portman et al. ......... 455/422.1

2002/0055852 A1 * 5/2002 Little et al. ................... 705/1
2002/0160766 A1 10/2002 Portman et al.
2003/0036379 A1 2/2003 Nikolai et al.

FOREIGN PATENT DOCUMENTS

EP 1 320 270 A1 6/2003

OTHER PUBLICATIONS

International Search Report, no date listed.
Xmarc News dated Mar. 20, 2001.

* cited by examiner

*Primary Examiner*—Erika A. Gary

(57) ABSTRACT

The disclosed method and system provide extensible or stand-alone location enabled services at granularity down to a stand-alone service. The various interfaces are preferably specified via DTD or schemas for communication based on XML. This collection of services enables management of mobile device locations information, and real-time services. Mobile device location is integrated with other location sensitive data, such as maps or demographics of a particular region or even the location of businesses and consumers to enable a richer service offering for customers of wireless carriers and service providers. Examples of such services include obtaining routes to a destination; providing a geocode corresponding to an address; providing an address corresponding to a geocode; providing maps as image files encompassing specified geocodes, locations, or addresses and the like. Additional services may be added to the disclosed system and method seamlessly due to the use of extensible interfaces.

21 Claims, 25 Drawing Sheets

Table Name:
MALL STORES
Location:
    WIRELESS/WIRELESS@SERVE.EXT
Purpose:
    XY table listing stores in MALL
Structure:
| | |
|---|---|
| STORE_NAME | -name of the store |
| PASSWORD | -password for access to store sales |

Client:
| | |
|---|---|
| DESCRIPTION | -descriptive information on store |
| X | -longitude |
| Y | -latitude |

Primary Key Columns:
    STORE_NAME, PASSWORD

900

---

Table Name:
MALL STORES SALES
Location:
    WIRELESS/WIRELESS@SERVE.EXT
Purpose:
    Holds "sales" information for stores in MALL
Structure:
| | |
|---|---|
| SALES_ID | -primary key of table |
| STORE_NAME | -name of the store |
| ITEM_NAME | -name of item on sale |
| ITEM DESCRIPTION | -description of item on sale |
| ITEM_PRICE | -price of item on sale |
| SALE_START_DATE | -date/time when sale starts |
| SALE_END_DATE | -date/time when sale ends |

Primary Key Columns:
    SALES_ID

LOCATION BASED SERVICE PROVIDER

CROSS-REFERENCE TO RELATED APPLICATIONS

This application claims the benefit, under 35 U.S.C. §119, of U.S. Provisional Patent Application Nos. 60/365,820, 60/378,805, and 60/411,435 filed on Mar. 19, 2002, May 7, 2002, and Sep. 7, 2002, respectively, which applications are incorporated herein by reference in their entirety.

FIELD OF THE INVENTION

The present invention pertains generally to the field of location-based information systems.

BACKGROUND

Advances in telecommunications technology have enabled faster and more accurate location of users carrying mobile devices. Examples of such technology are described in U.S. Pat. Nos. 6,477,362 and 6,477,379, both issued on Nov. 5, 2002, which patents are incorporated herein by reference in their entirety. These patents respectively describe systems for directing emergency services to a user based on her or his location and for locating a mobile device with the aid of two base stations.

Global Positioning Systems (GPS) receivers are described in several publications and references, such as the U.S. Pat. No. 5,528,248, issued on Jun. 18, 1996, which is hereby incorporated by reference herein in its entirety. This patent discloses a personal Digital Location Assistant based on a GPS Smart Antenna and a computing device.

GPS utilizes signals transmitted by a number of in-view satellites to determine the location of a GPS antenna which is connected to a receiver. Each GPS satellite transmits two coded L-band carrier signals which enable some compensation for propagation delays through the ionosphere. Each GPS receiver contains an almanac of data describing the satellite orbits and uses ephemeris corrections transmitted by the satellites themselves. Satellite to antenna distances may be deduced from time code or carrier phase differences determined by comparing the received signals with locally generated receiver signals. These distances are then used to determine antenna position. Only those satellites which are sufficiently above the horizon can contribute to a position measurement, the accuracy of which depends on various factors including the geometrical arrangement of the satellites at the time when the distances are determined.

Distances measured from an antenna to four or more satellites enable the antenna position to be calculated with reference to the global ellipsoid WGS-84. Local northing, easting and elevation coordinates can then be determined by applying appropriate datum transformation and map projection. By using carrier phase differences in any one of several known techniques, the antenna location can be determined to an accuracy on the order of .+-0.1 cm.

Locations may be specified by various means, both actual and representational, including geocodes, centroids, and street vectors/segments. These and other terms are used by various technologies to provide systems and methods for delivering spatially-dependent services.

A geocode is a specification of a position using a suitable coordinate system and at a granularity that is sufficient for a particular application. For example, a geocode specifying a latitude and a longitude specifies a position on the surface of the earth. A geocode may also specify a height above the surface of the earth. A geocode encompasses providing spatial information in a form other than specifying the longitude and the latitude. Other examples of geocodes include postal centroids that are associated with areas sharing a common zip code. A centroid is a geographic center of an entire area, region, boundary, etc. for which the specific geographic area covers. A familiar example is the association between a centroid and a postal code, such as the ZIP codes defined and used by the United States Postal Service.

Street vectors are address ranges assigned to segments of individual streets. Street vectors assist in displaying digitized computer-based street maps. Often, street vectors appear as left and right side address ranges, and may be also used for geocoding a particular address to a particular street segment.

Geocoding is described in U.S. Pat. No. 6,101,496 issued on Aug. 8, 2000, and assigned to the assignee of the present application, which patent is incorporated herein by reference in its entirety. In the context of spatially meaningful databases, geocoding is the act, method or process of assigning x and y coordinates (usually but not limited to latitude and longitude) to records, lists and files containing location information (full addresses, partial addresses, zip codes, census FIPS codes, etc.) for cartographic or any other form of spatial analysis or reference. Geocoding encompasses assigning spatial parameters to data to visualize information and exploring relationships based on spatial distribution. Some examples include census data or survey data that identify the residences of individuals with a particular income bracket, ethnicity, political affiliations, employment, and the like.

Geocoding is often performed by running ungeocoded (referred to hereafter as "raw data") information such as a list of customers through software and/or data which performs table lookup, fuzzy logic and address matching against an entire "library" of all known or available addresses (referred to hereafter as "georeferenced library") with associated x,y location coordinates.

A georeferenced library may be compiled from a number of varied sources including US Census address information and US postal address information, along with Zip Code boundaries and other various sources of data containing geographic information and/or location geometry. If a raw data address cannot be matched exactly to a specific library street address (known as a "street level hit"), then an attempt may be made to match the raw data address to geographic hierarchy of point, line or region geography of ever decreasing precision until a predetermined tolerance for an acceptable match is met. The geographic hierarchy to which a raw data record is finally assigned is also known as the "geocoding precision." Geocoding precision tells how closely the location assigned by the geocoding software matches the true location of the raw data. Geocoding technology generally provides for two main types of precision: street level and postal ZIP centroid. Street level precision is the placement of geocoded records at the street address. Street level precision attempts to geocode all records to the actual street address. In all likelihood, some matches may end up at a less precise location such as a ZIP centroid (ZIP+4, ZIP+2, or ZIP code) or shape path (the shape of a street as defined by points that make up each segment of the street.

One form of spatial indexing for storing and accessing location sensitive information in databases is disclosed by U.S. Pat. No. 6,363,392 issued on Mar. 26, 2002, which is hereby incorporated by reference it its entirety. This patent uses quad keys to provide a flexible, web-sharable database with proximity searching capability. The process for generating quad keys begins with geocoding where a description of a geographic location is converted into a longitude and latitude, which may be represented as integers at some resolution. Then, a quad key is generated in binary form, with the bits interleaved (most significant bit (MSB) from x, followed by MSB from y, followed by next-MSB from x, next-MSB from y, etc.).

Various technologies for providing location information include triangulation using radio signals, global positioning systems ("GPS"), and other technologies described in U.S. Pat. Nos. 5,528,248 and 6,477,379. U.S. patent application Ser. No. 10/159,195 filed on May 31, 2002 discloses a method and system for obtaining geocodes corresponding to addresses and addresses corresponding to geocodes. This application claims the benefit of the disclosure and filing date of U.S. Provisional Patent Application No. 60/256,103 filed on May 31, 2001. These patent applications are also incorporated herein by reference in their entirety. These and other means for determining position, including those developed subsequent to this invention, may be used to provide location information.

In another aspect, it should be noted that the term "interface" is commonly used in describing software and devices. For clarity, as used herein the term "interface" differs from a "user interface" in that a user interface is a presentation made to a user offering various choices, information, and operable elements such as buttons, knobs, and the like. A user interface may include physical components as well as transient displayed information. An interface, in contrast, in the context of object oriented ("OO") languages represents methods that are supported either by the interface itself in some OO languages, or provided in the interface as abstract methods which are provided by classes implementing the interface. A familiar example of the latter kind of OO paradigms is JAVA, which allows platform independent coding of software.

SUMMARY OF THE INVENTION

A method and system are disclosed for providing extensible or stand-alone location enabled services. The disclosed method and system provide services that may also utilize the internet using an eXtensible Markup Language Application Interface (XML-API). These services enable a collection of applications to manage information specific to mobile locations, provide services, including real-time services, with complete or partial integration via a common service manager. Preferably, the XML-API forms a platform that ties together the key services commonly used in the development of these mobile location applications.

In the context of cellular networks and their integration into web-based communication, mobile location is integrated with other location sensitive data, such as maps or demographics of a particular region or the location of businesses and consumers to enable a richer service offering for customers of wireless carriers and service providers.

Examples of such services may include obtaining one or more routes between a starting point and a destination; providing a geocode corresponding to an address; providing an address corresponding to a geocode; providing maps as image files encompassing specified geocodes, locations, or addresses; obtaining a position for a mobile device; obtaining the identity of a location; obtaining one or more geographic features near a location; managing person profile data; providing a map corresponding to a location; providing a coordinate geometry service for carrying out geometric calculations and measurements; performing coordinate transformations; providing traffic related information; generating enterprise specific maps; and providing an enterprise profile.

Additional services may be added to the disclosed system and method. Moreover, although the illustrative embodiments disclose integration of the various services, they may be offered at various levels of granularity down to offering stand-alone services or any combination of services.

DETAILED DESCRIPTION OF THE FIGURES

Figure 8:
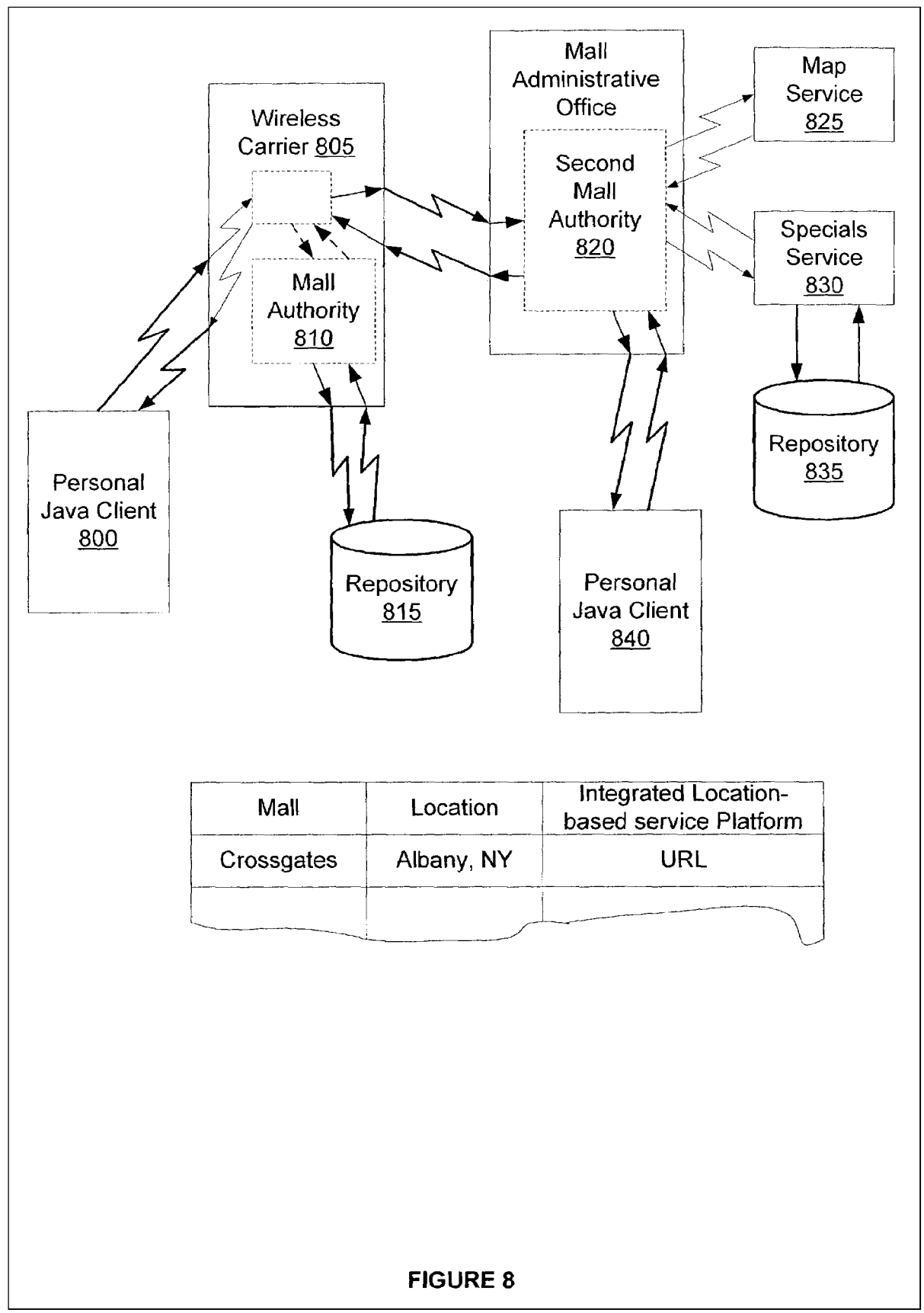

FIG. 8 further illustrates interactions between a client and an integrated location-based service platform performing multiple functions FIG. 9 illustrates storage of sale and authorization information in a location based system that allows secure access and public access with more limited privileges.

Figure 10:
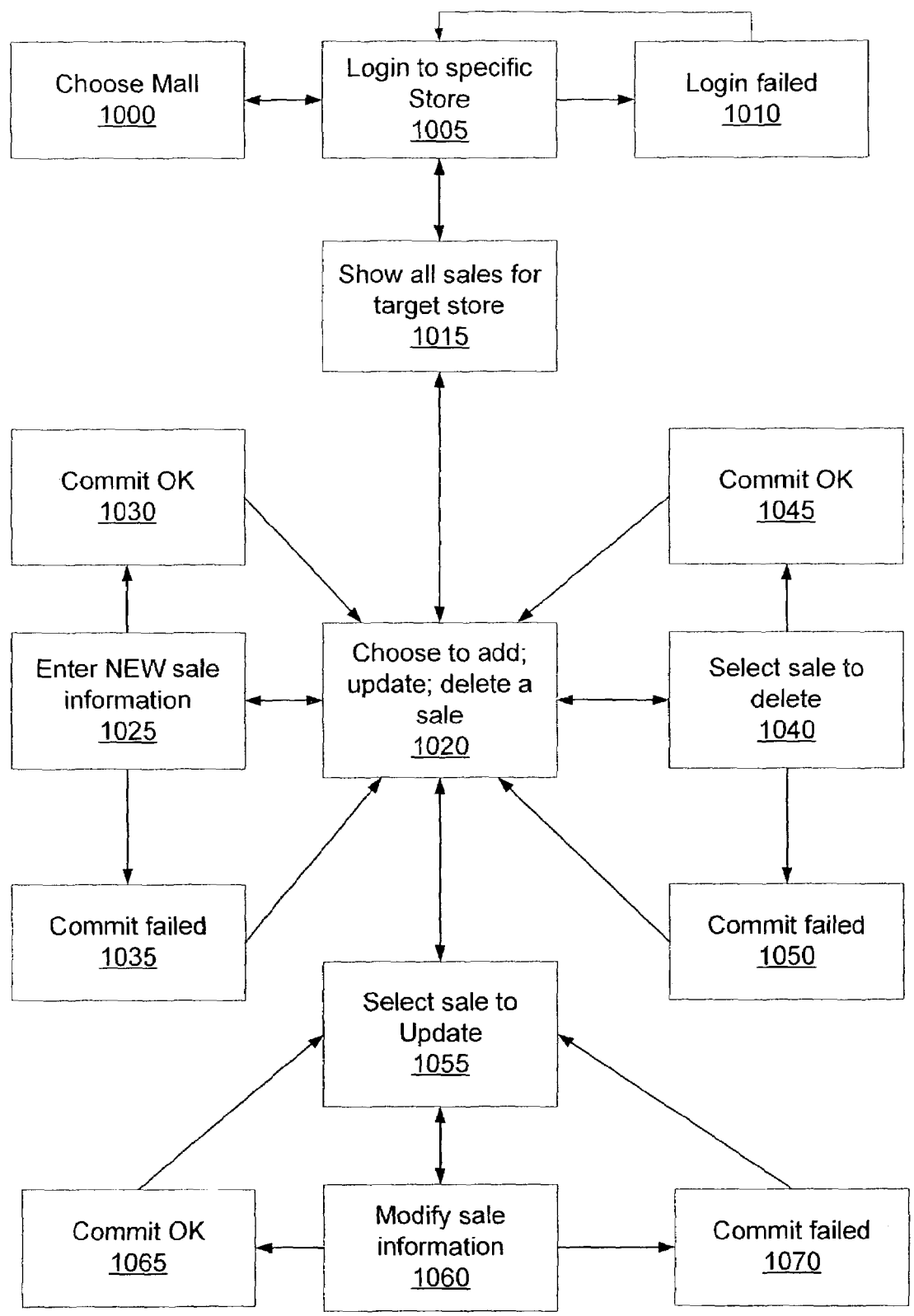

FIG. 10 is a flow chart indicating the actions available to a store administrator.

Figure 11:
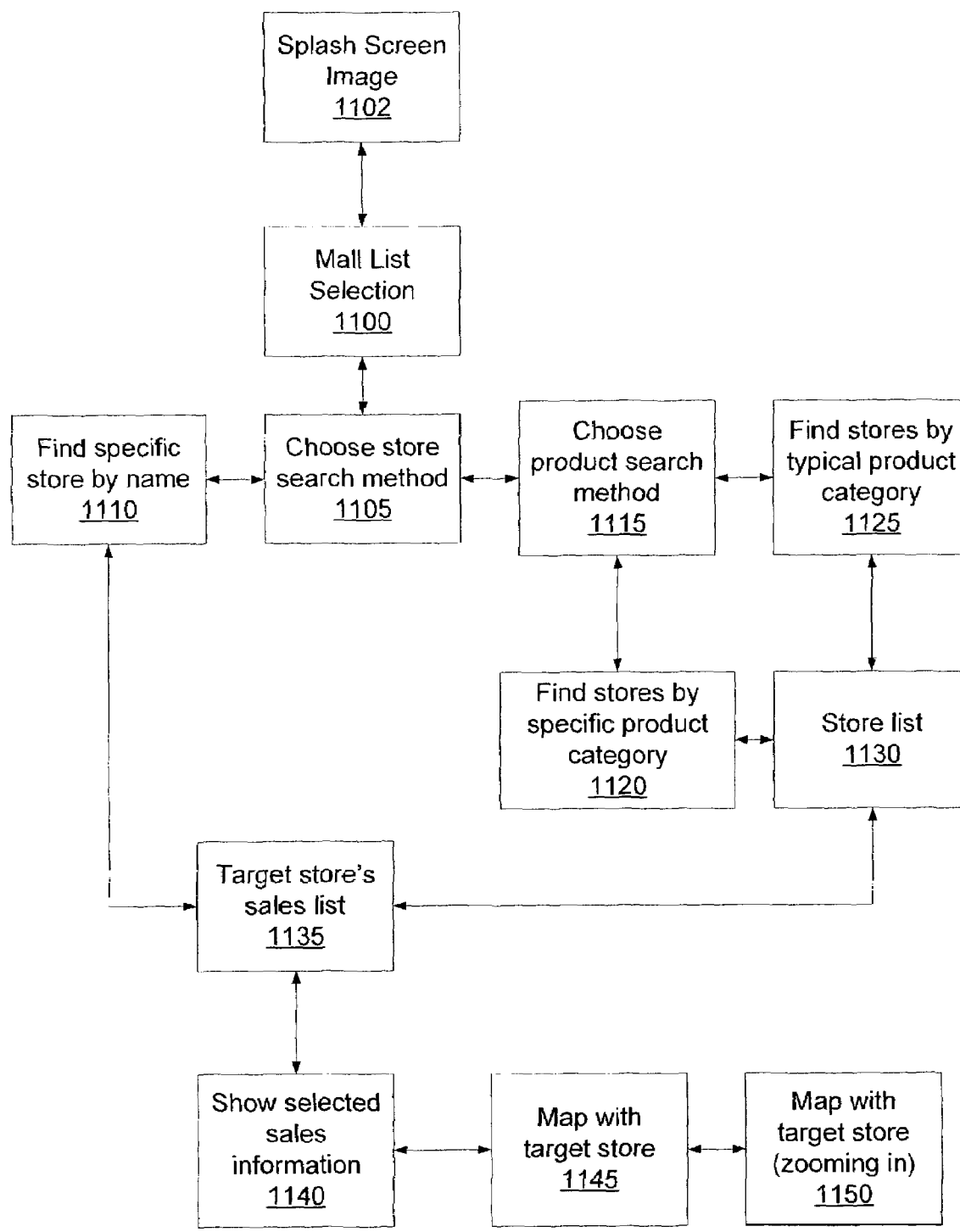

FIG. 11 is a flow chart indicating the actions available to a user who has been provided with a list of local-content servers.

Figure 12:
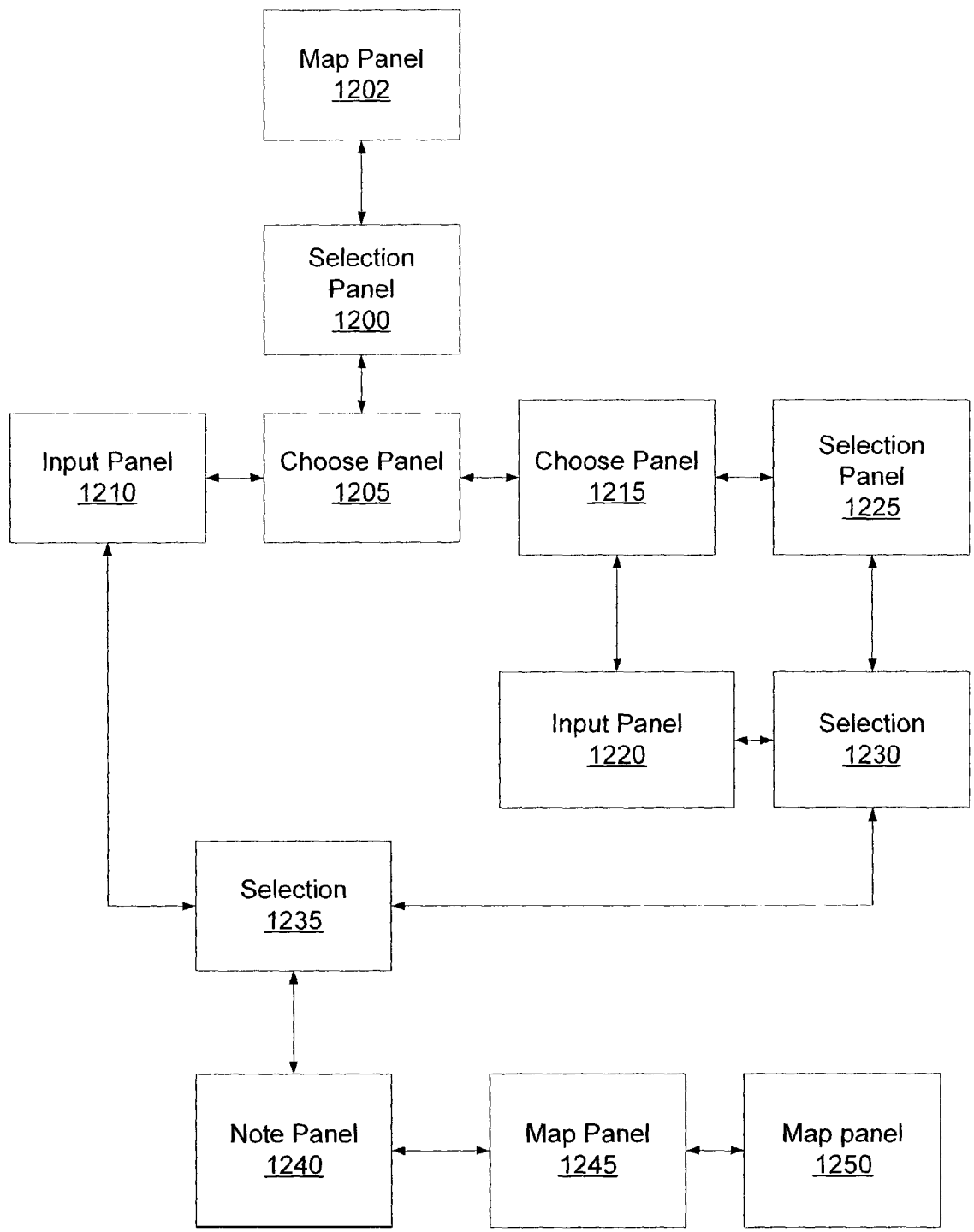

FIG. 12 shows the Java panels corresponding to the various steps described in FIG. 11.

Figure 13:
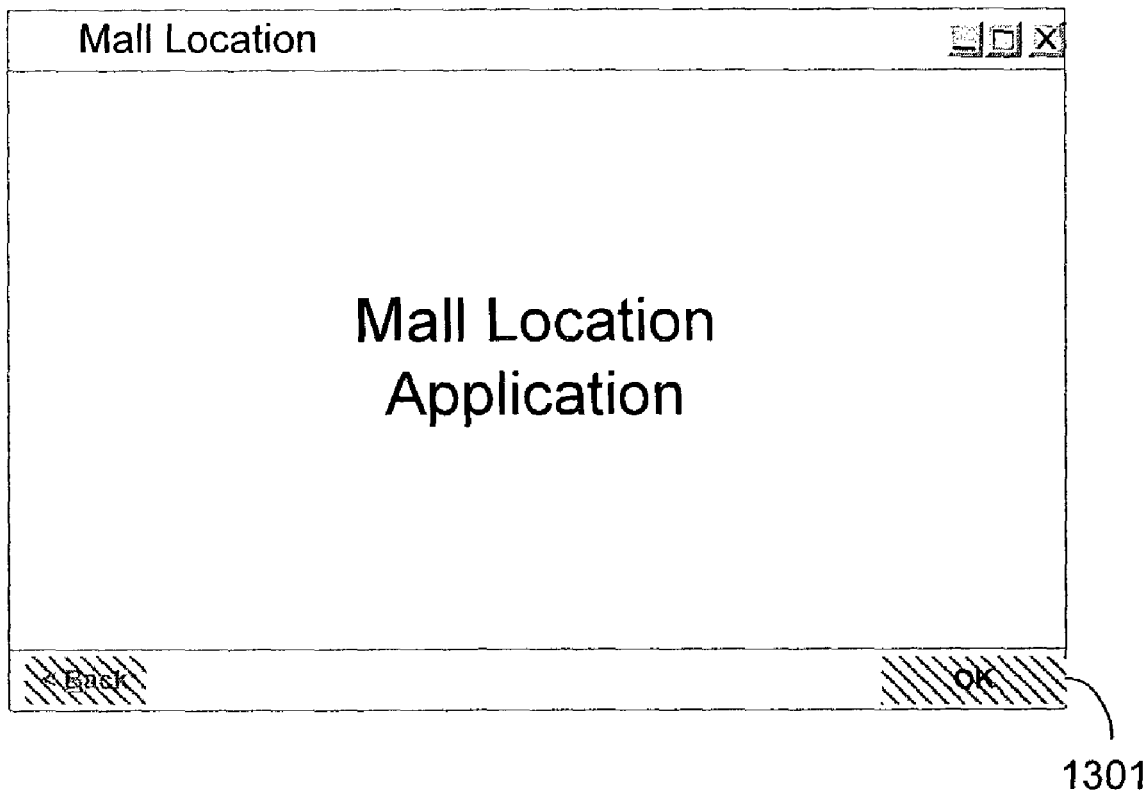

FIG. 13 shows a user interface viewed by a user upon starting a mall and store browsing application on his mobile device.

Figure 14:
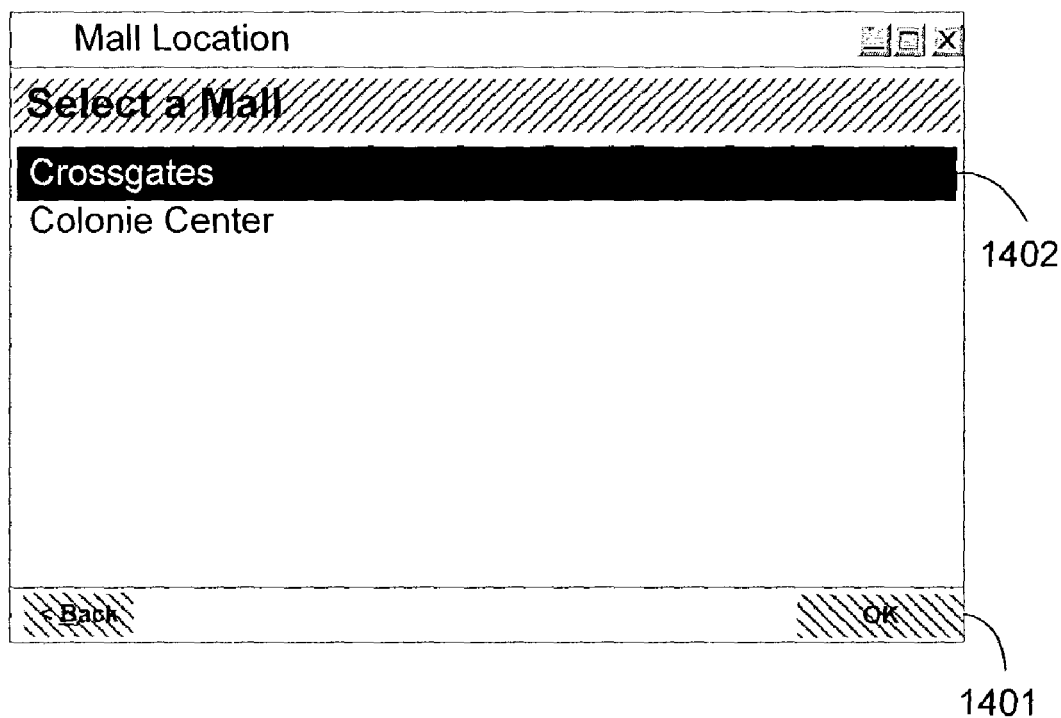

FIG. 14 shows a user interface displaying a list of local-content servers serving the user's location.

Figure 15:
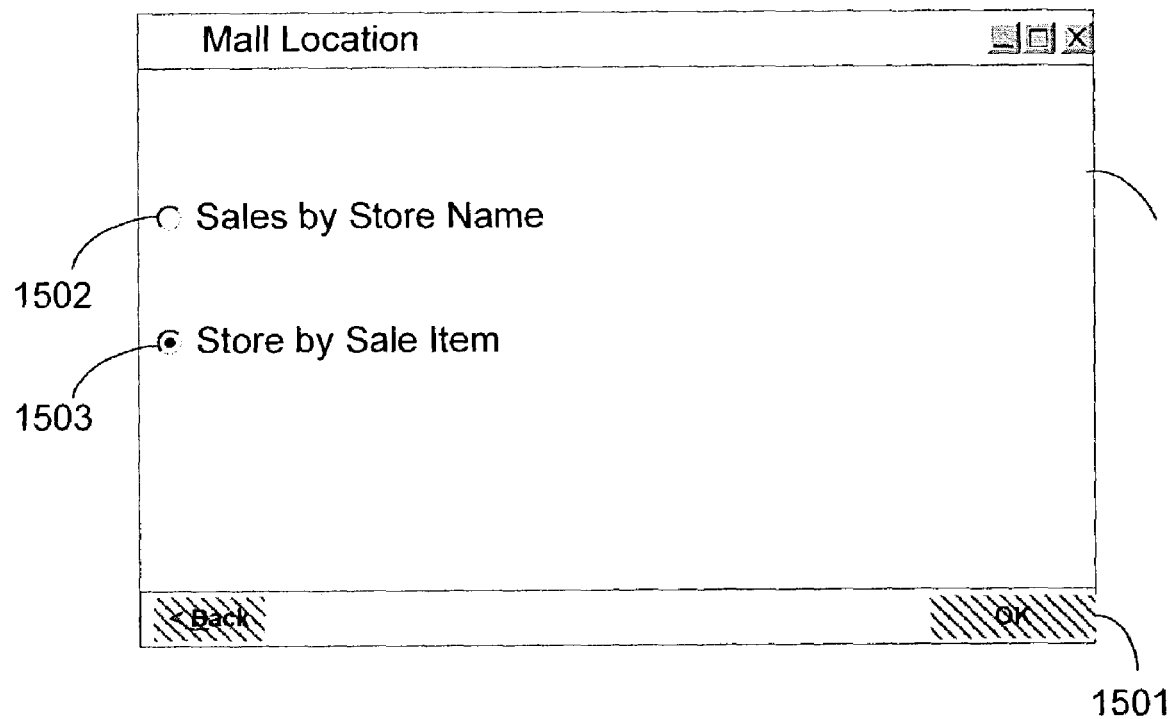

FIG. 15 shows a user interface that allows the user to indicate whether the user wishes to enter a store name, or to select a store by specifying a product.

Figure 16:
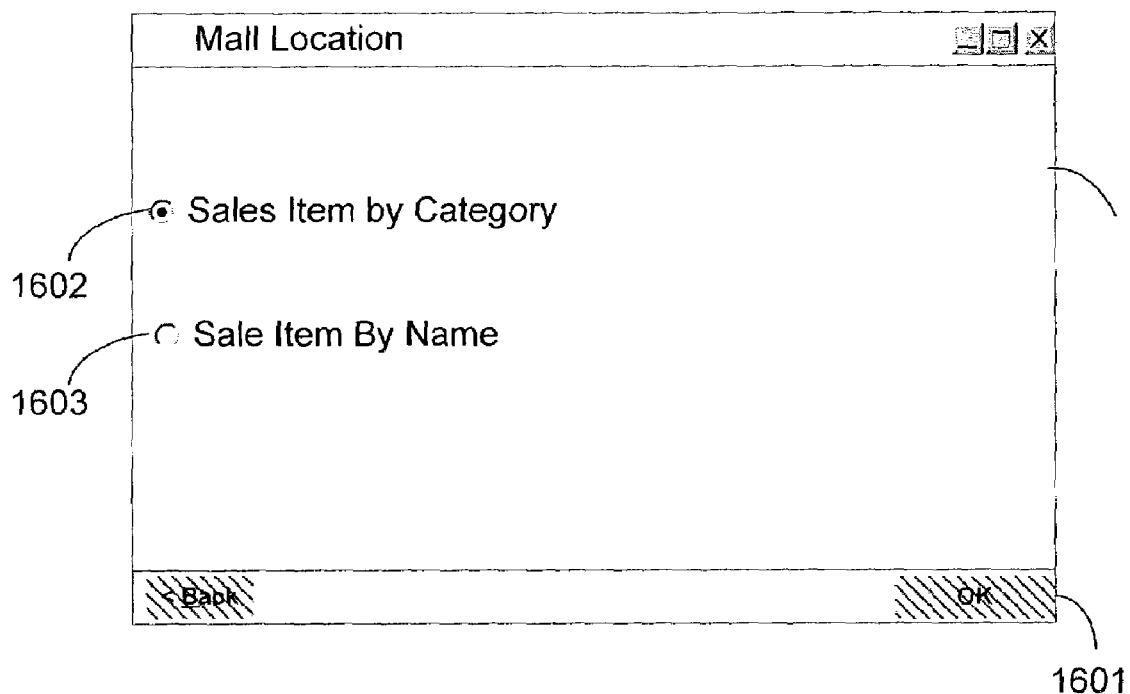

FIG. 16 shows a user interface that allows the user to indicate whether the user wishes to enter a product name, or to select a product by category.

Figure 17:
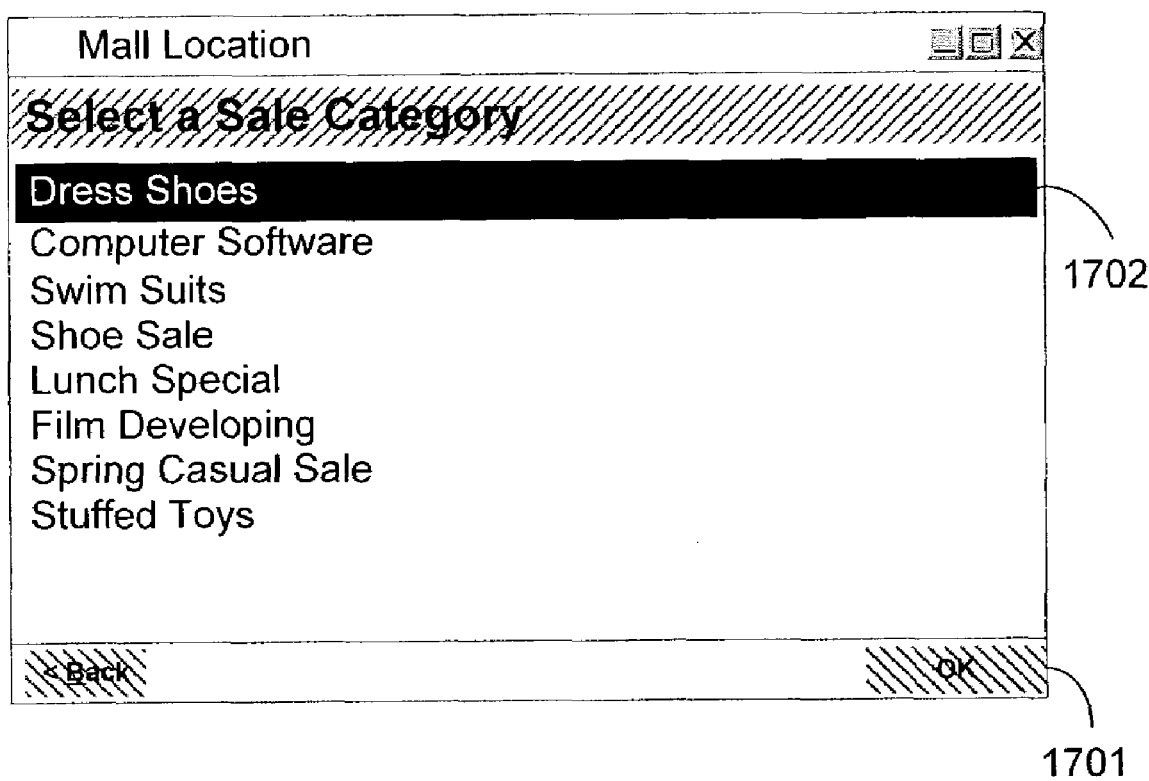

FIG. 17 shows a user interface displaying categories of items for which a mall-server contains sale information.

Figure 18:
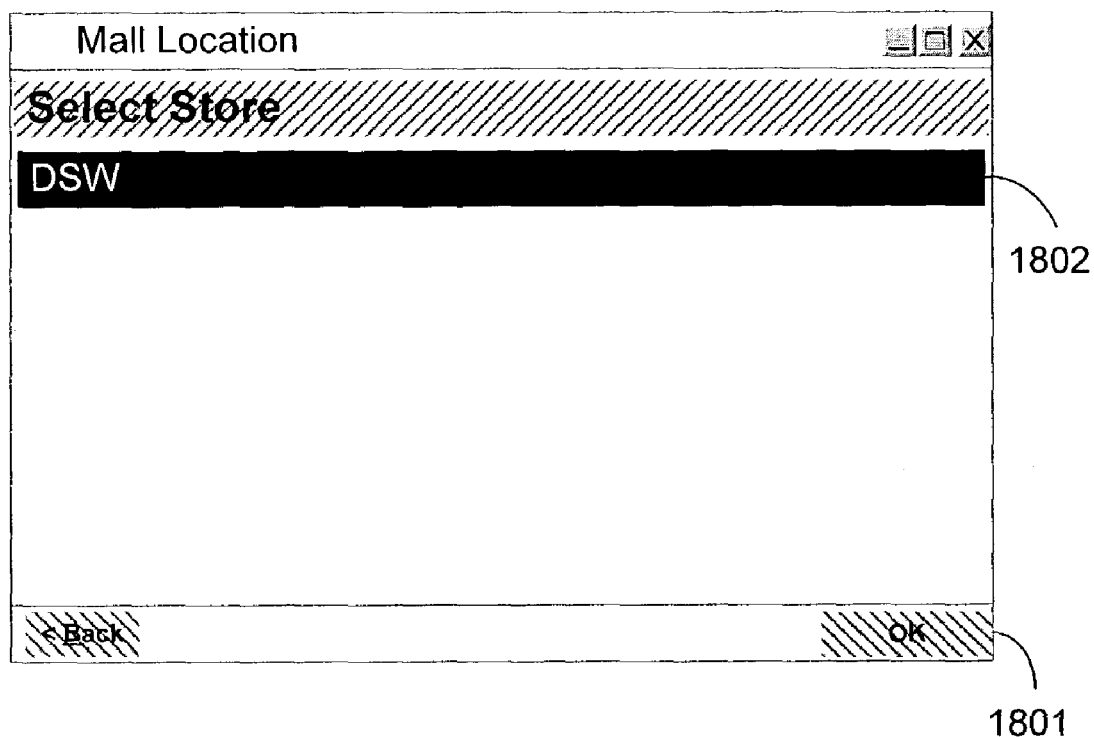

FIG. 18 shows a user interface displaying a list of stores having sale items in a mall-server database in the category selected by the user.

Figure 19:
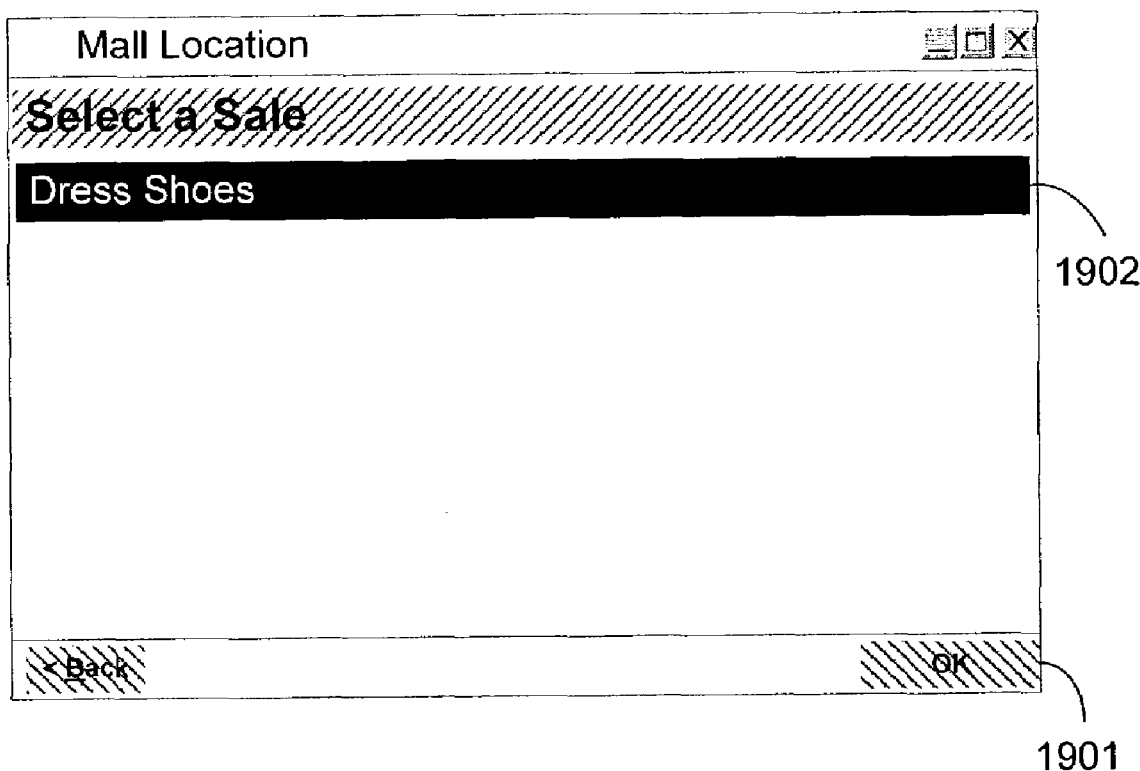

FIG. 19 shows a user interface displaying sale items in a local-content server database for the specific store.

Figure 20:
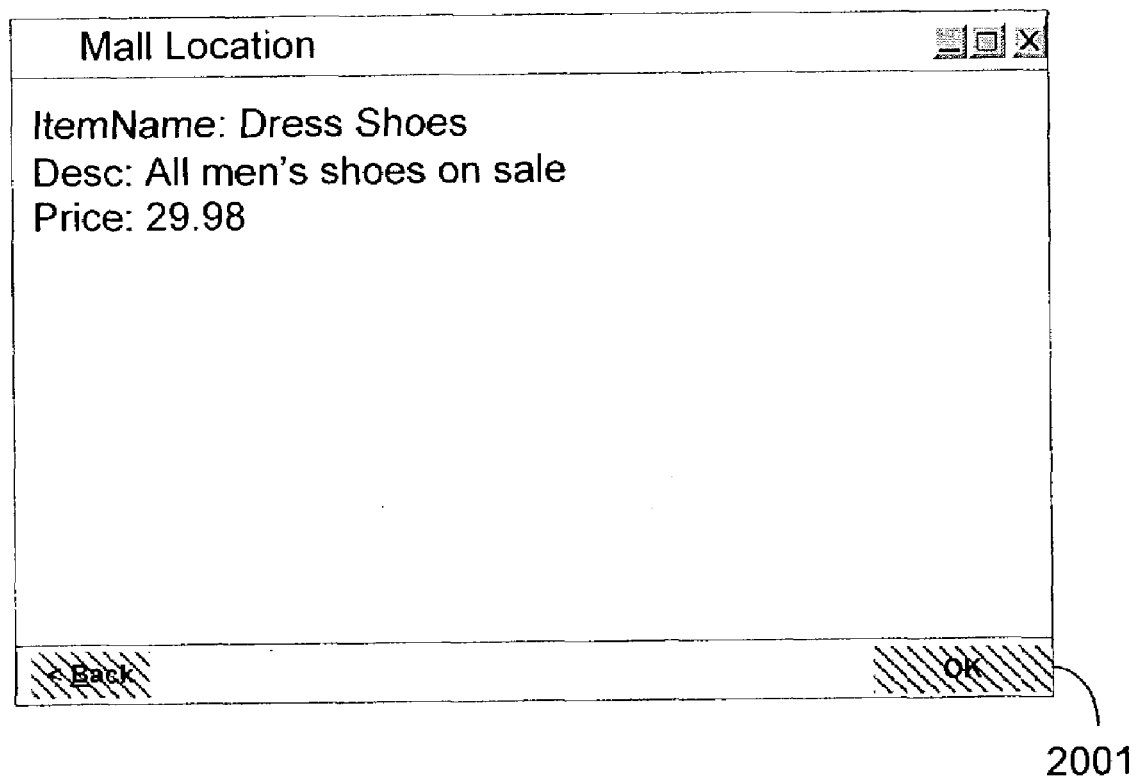

FIG. 20 shows a user interface displaying information about a sale item selected by the user.

Figure 21:
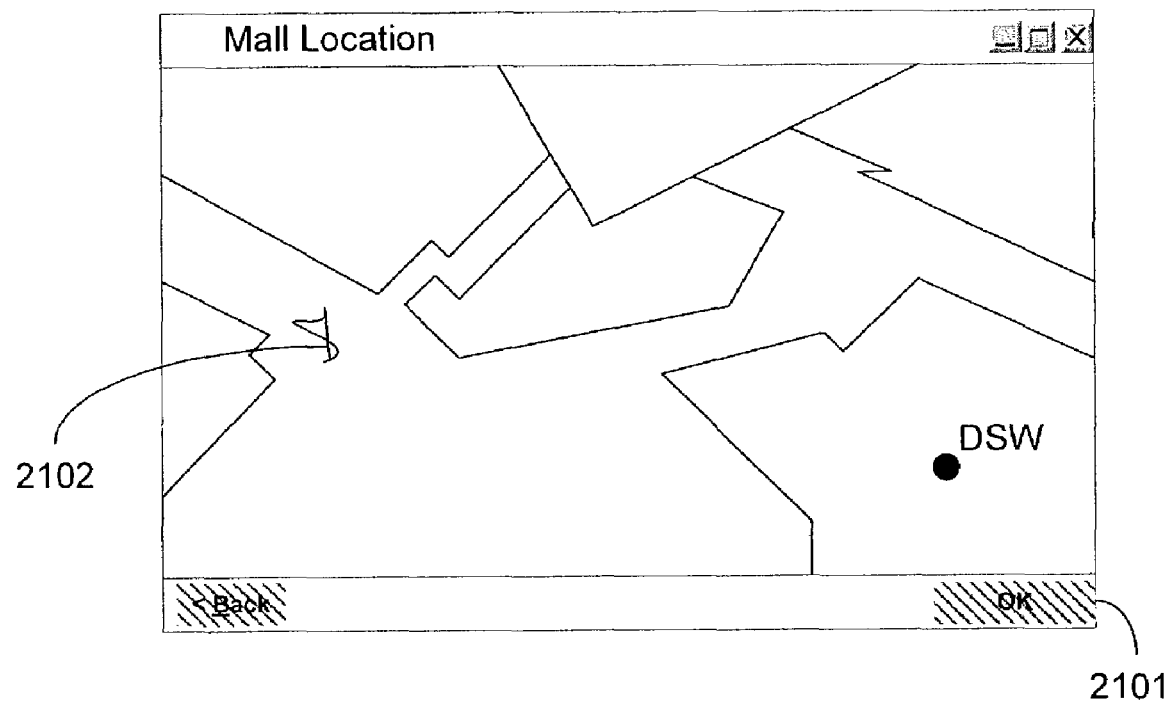

FIG. 21 shows a user interface displaying a map showing the location of a store relative to the user.

Figure 22:
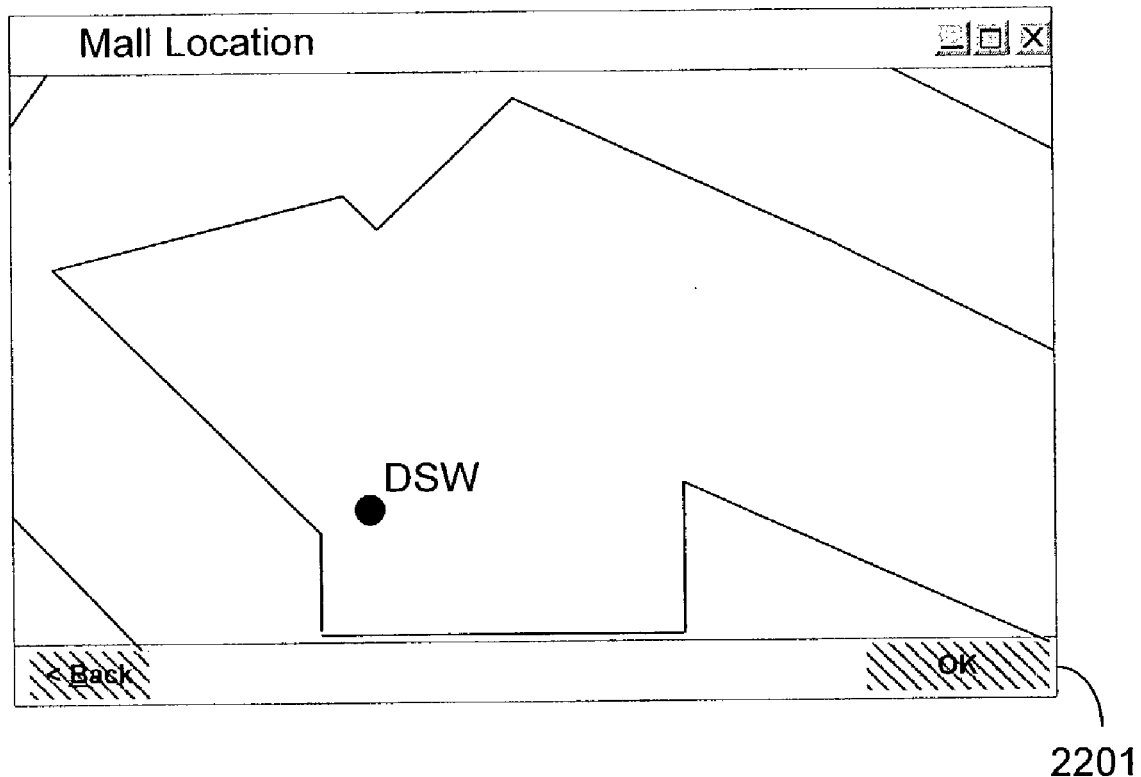

FIG. 22 shows a user interface displaying a map zoomed-in to show the store location in more detail.

Figure 23:
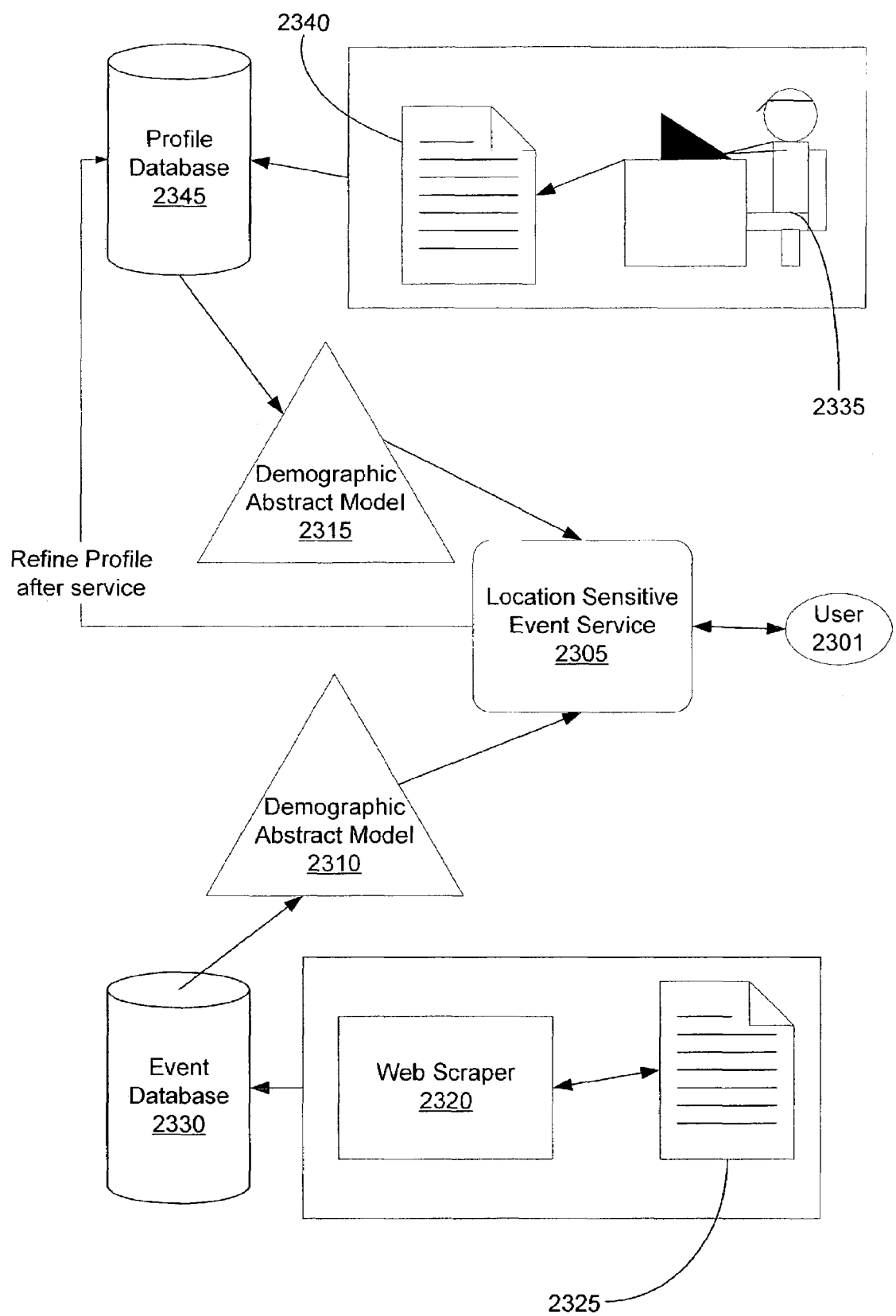

FIG. 23 illustrates an exemplary architecture for an embodiment of the location sensitive event service.

Figure 24:
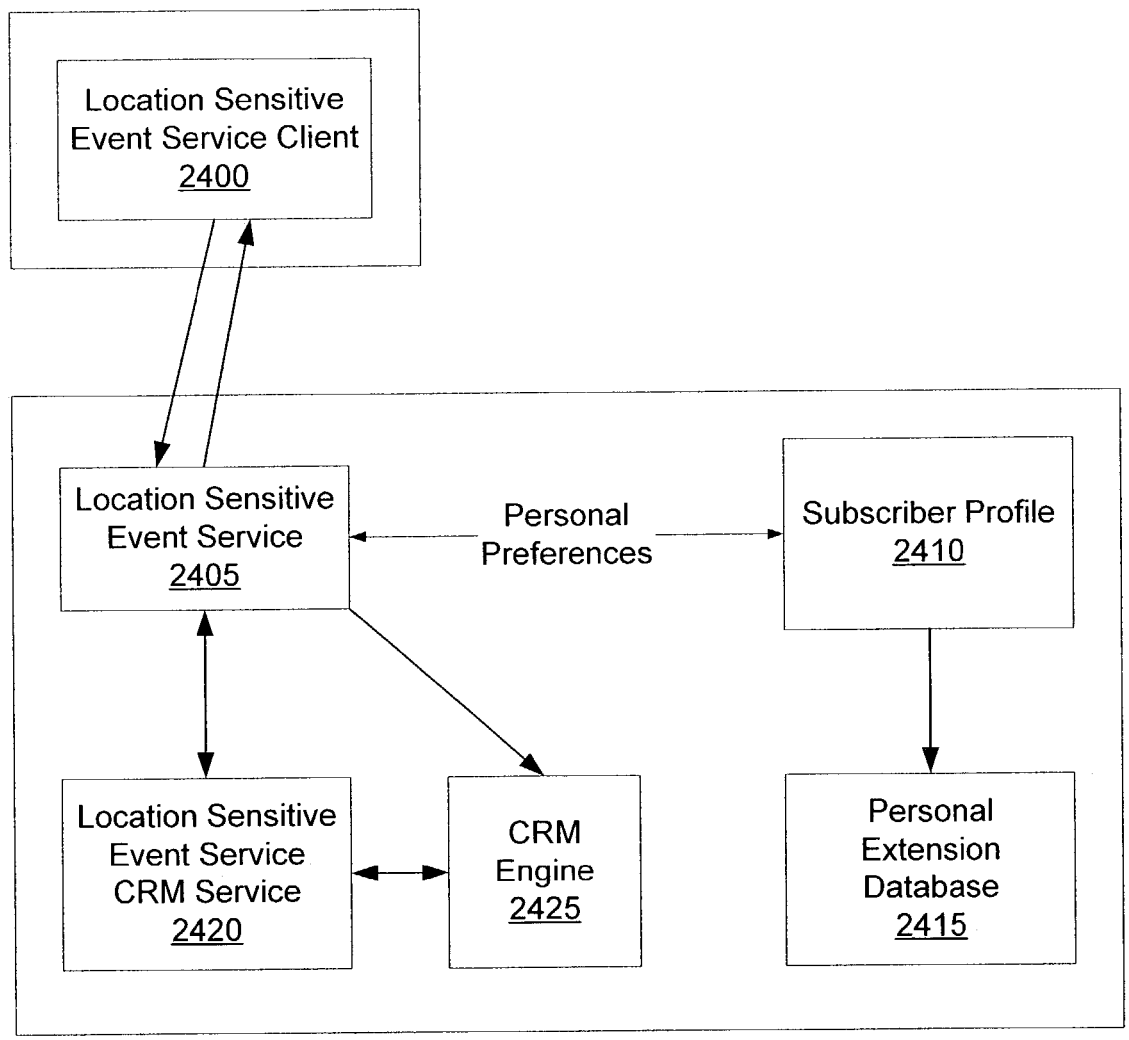

FIG. 24 provides another illustration of an architecture providing a location sensitive event service.

Figure 25:
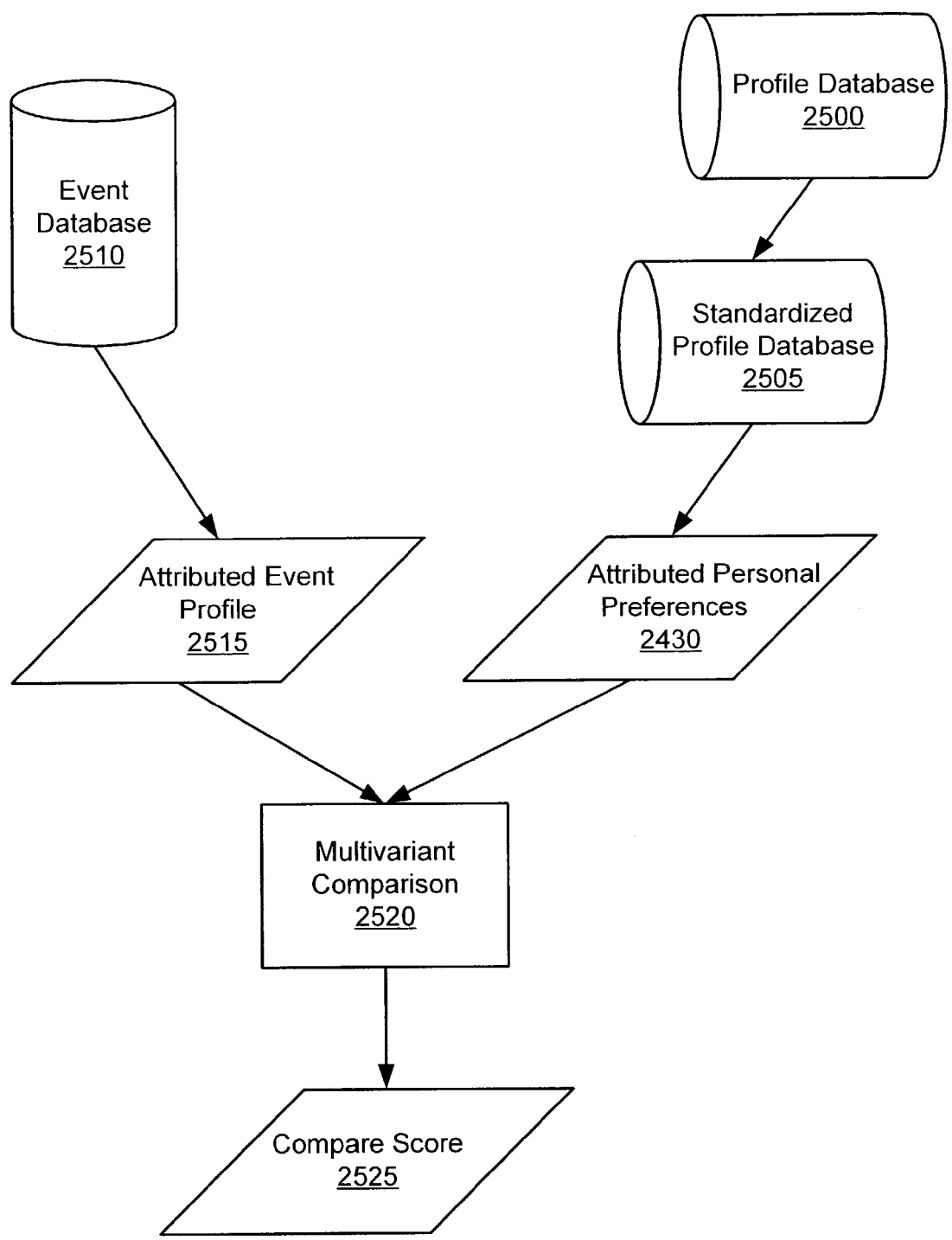

FIG. 25 summarizes an illustrative process for generating ordered lists of events corresponding to user profiles.

DETAILED DESCRIPTION OF THE INVENTION

A method and system for providing one or more location-based services with the aid of a markup language based interface with one or more service managers and access to one or more databases is disclosed. The method and system are typically, but not as a requirement for practicing the invention, implemented via at least one server, possibly in the form of a servlet, and a database that in combination with specified location information, enables delivery of customized services, options, and offers to customers. The method and system extend the advances made in determination of location of mobile users to offer customized location-based services. In addition, these services also integrate, when desirable, demographic data to generate services suited to various demographic segments and markets. Such demographic data includes user preferences, geographical distribution of users, mobility patterns and the like. These and other applications, including stand alone and integrated implementations, are described by way of the following examples and exemplary embodiments, starting with a description of an integrated implementation that allows one or more location-based services to be offered to users.

An Integrated Location-Based Service Platform

The method and system of the present invention leverage wired and/or wireless connectivity, including that over the Internet, to provide services of interest to consumers. A preferred embodiment of the present invention includes providing an integrated location-based service platform, an example of which is the miAware™ set of services provided by the MapInfo® Corporation of Troy, NY as part of its Mobile Location Services (MLS). miAware™ includes an XML based API that enables both implementation and efficient communication of various requests and responses as described at, milocate.mapinfo.com/miAware/, a copy of which, dated Mar. 19, 2003, is attached as APPENDIX to this application.

An integrated location-based service platform is also described in the U.S. Provisional Patent Application No. 60/365,820 filed on Mar. 19, 2002, which is incorporated herein by reference in its entirety.

Such an integrated location-based service platform, for instance, the miAware™, provided by the MapInfo® Corporation of Troy, NY, provides numerous services and facilities including providing a route to a target, finding a nearest specified type of target, geocoding, geodecoding, and determining a mobile position service for a person with a mobile device such as a GPS or cell phone and the like. These services are accessed via user interfaces and underlying XML APIs.

Figure 1:
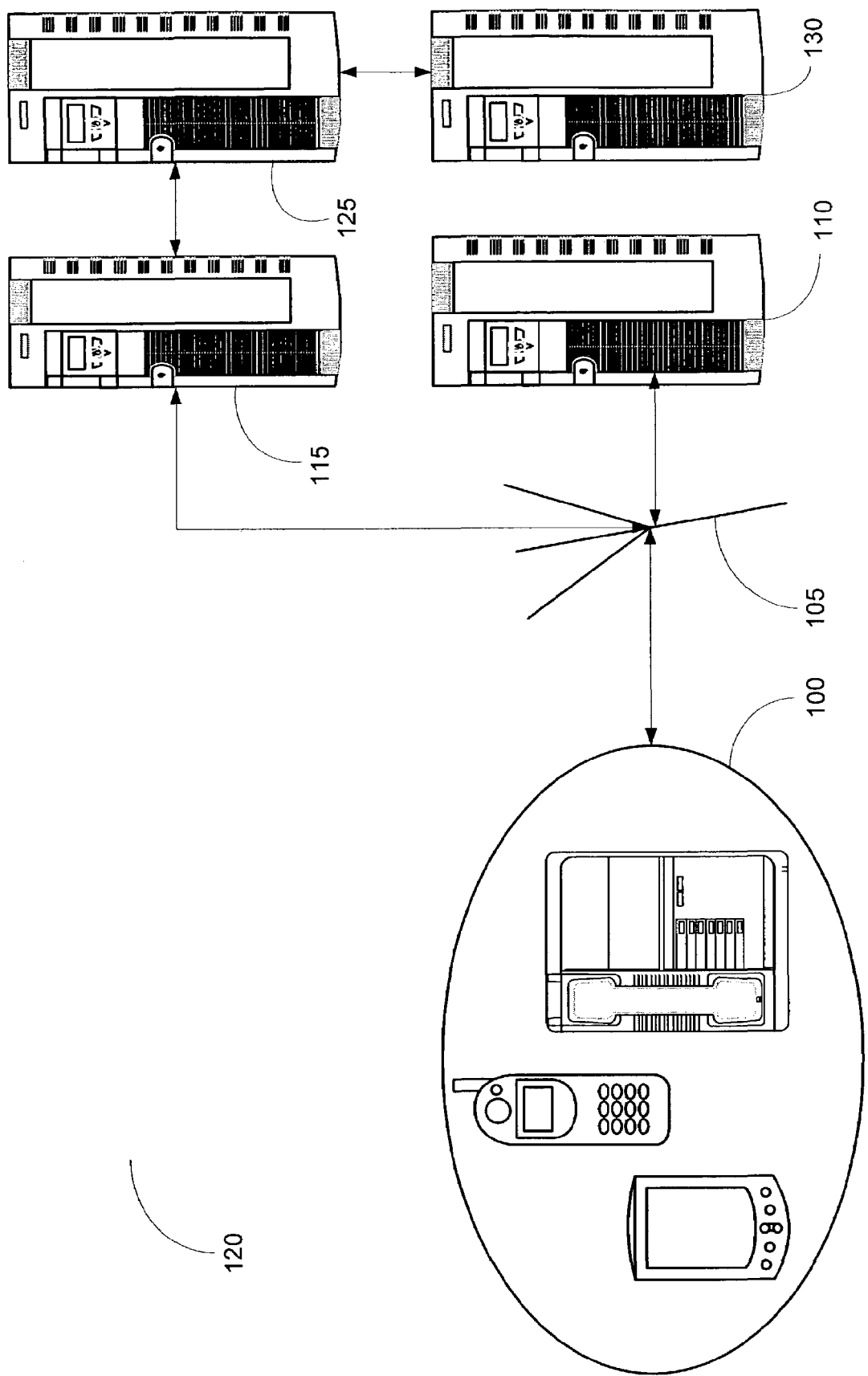
FIG. 1 is an illustration of an exemplary context for providing an integrated location-based service platform.

FIG. 1 illustrates a typical context for providing an integrated location-based service platform. Users 100, including mobile users, access via antenna 105 gateway 110 and location server 115. Location server 115 may further connect to the Internet 120 or to portal platform 125 to provide an integrated location-based service platform.

Figure 2:
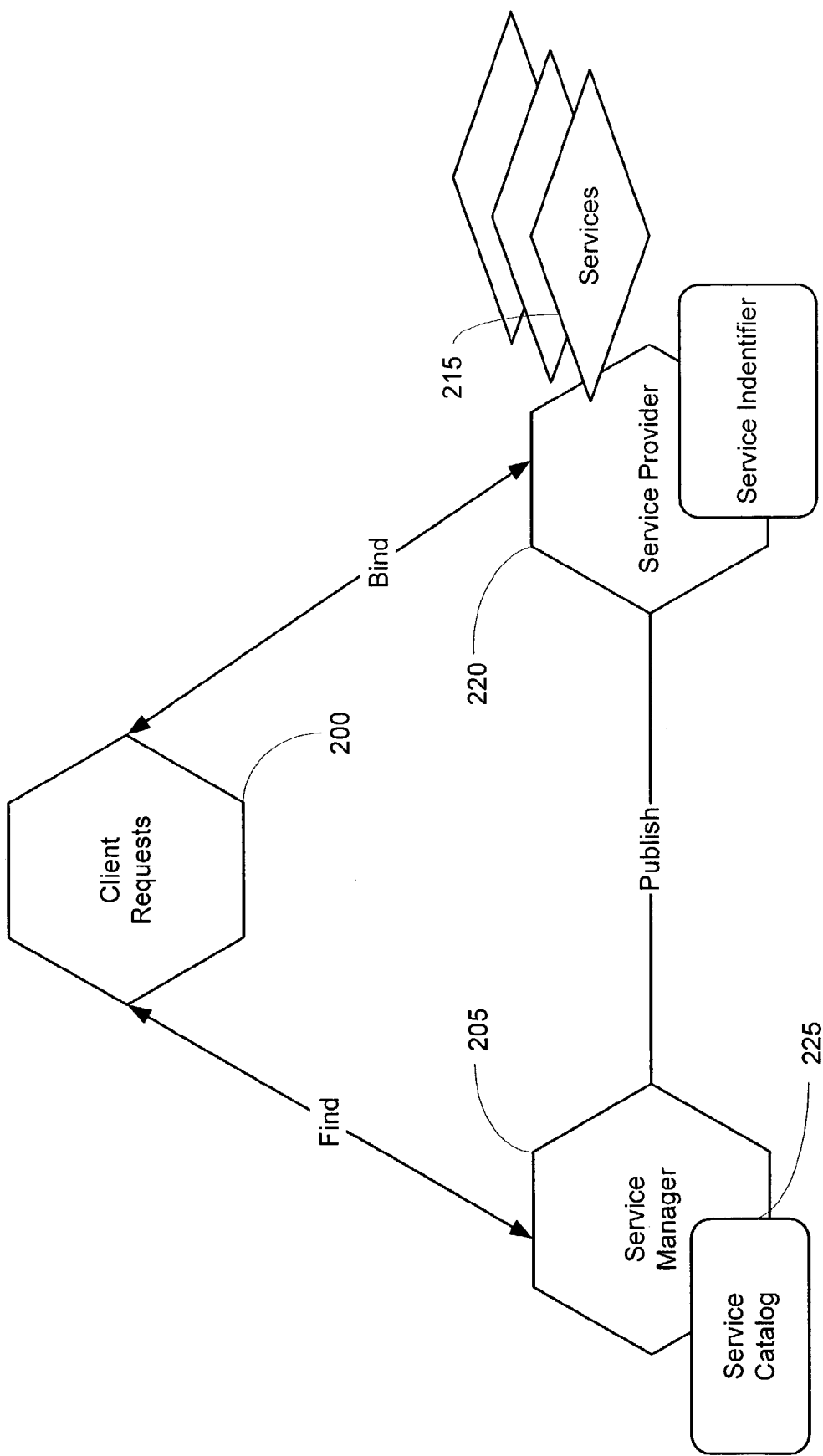
FIG. 2 is a schematic representation of an integrated location-based service platform.

FIG. 2 illustrates a schematic representation of an integrated location-based service platform. Client requests 200 are directed to service manager 205, which is in contact with a service catalogue 210 containing a description of various services available via service manager 205. The service catalogue is preferably in the form of document-type definitions ("DTD") or a schema (e.g., specified under the OpenLS standard), or any other suitable format specifying the form of requests and responses for obtaining a particular service. This enables a client request to be formatted for proper parsing and processing. Typically requests are sent encoded in a markup language such as XML. Such use of a markup language allows a large number of interfaces to be provided to a variety of services at a common portal, service manager 205. Preferably, communications by various services 215, as part of service provider level 220, with service manager 205 are also encoded in a markup language in accordance with a DTD specification that requires support for resource management and methods for starting and terminating a particular module with support for multi-threading. This enables a service to register itself with service manager 205 and publish itself to service catalogue 225, where it may be discovered, along with the syntax for service requests directed to the service, by client requests directed to the service catalogue 225. This architecture makes the integrated location-based service platform flexible since various different services may be added or removed from the integrated location-based service platform to provide customized services. With the ease of adding new services or terminating existing services, the integrated location-based service platform provides a common platform for accessing a variety of location-based services. It should be noted that many of the services accessed through service manger 205 may also be provided as stand alone services, possibly concurrently with providing access via service manager 205.

Figure 3:
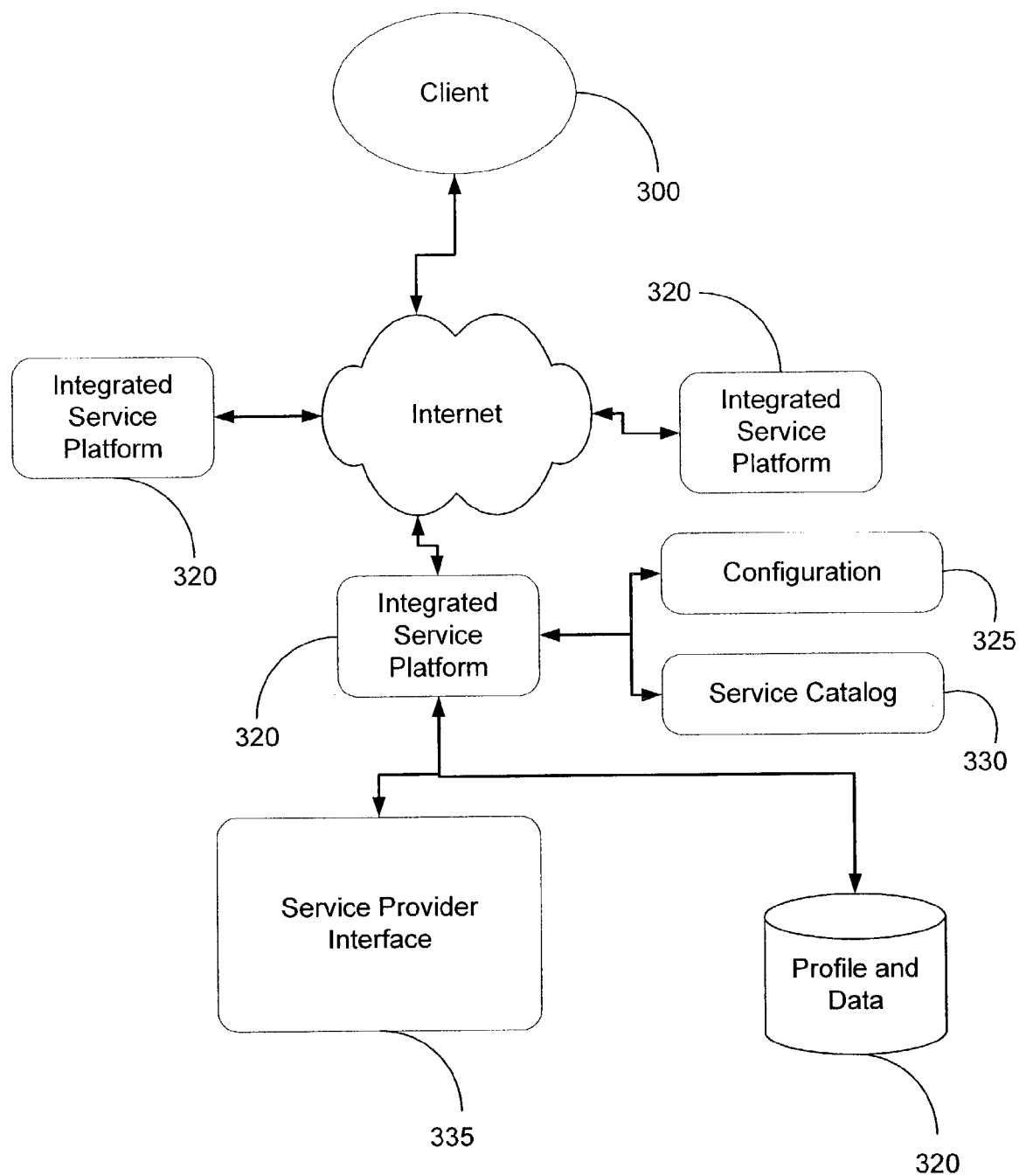
FIG. 3 is an illustration of various interactions at a service manager in the course of providing services via an integrated location-based service platform.

FIG. 3 provides an illustration of various interactions at a service manager in the course of providing services via an integrated location-based service platform. Service request 305 elicits service response 310 to client 300. Advantageously, service request 305 and response 310 may be transmitted via a network, such as Internet 315, to service manager 320. Service manager 320 has integrated location-based service platform configuration information 325, as well as information about the various available services in service catalogue 330. In response to receiving service request 305, service manager 320 generates service object 335, which is directed to service provider interface 340 specified in service request 305. Service response object 345 generated by the service provider via service provider interface 340 is sent to service manager 320, which in turn, generates service response 310 directed to client 300.

Figure 4:
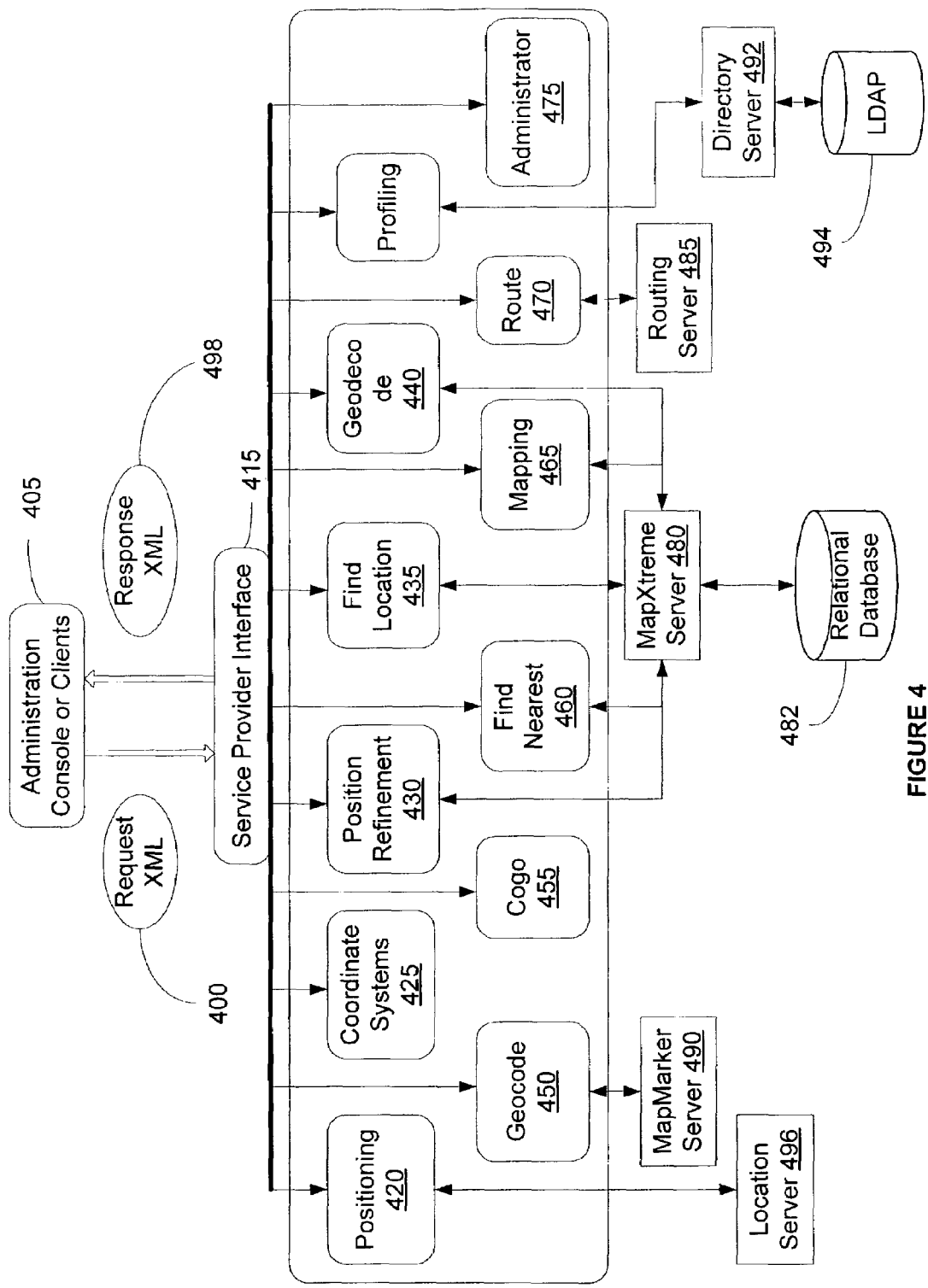
FIG. 4 is an illustration of an integrated location-based service platform along with the various service provider modules, spatial servers accessed by the service provider modules, third party servers and data repositories used to respond to service requests.

FIG. 4 illustrates an integrated location-based service platform along with various service provider modules, spatial servers accessed by the service provider modules, third party servers and data repositories used to respond to service requests. Request 400 from client 405 is received at integrated location-based service platform server 410 via service provider interface 415. Service provider interface 415 directs request 400 to one of service modules providing services for positioning 420, coordinate system transformation 425, position refinement 430, finding location 435, geodecoding 440, profiling 445, geocoding 450, Cogo 455 (coordinate geometry service), finding nearest geographical of interest 460, mapping 465, routing 470, and administration 475. As illustrated, although not as a requirement for practicing the invention, service modules: position refinement 430, finding location 435, geodecoding 440, finding nearest geographical of interest 460, and mapping 465 communicate with spatial server 480, which may be a MapXtreme® Server provided by Mapinfo® Corporation, accessing in turn relational database 482. Similarly, routing 470 accesses routing server 485 while geocoding 450 accesses spatial server 490, which may be a MapMarker® Server provided by MapInfo® Corporation. In addition, modules for profiling 445 access third party directory server 492, which, in turn, accesses LDAP 494, while positioning 420 accesses third party location server 496. The result sent by one or more of the various service modules is used to generate response 498 to request 400. Thus, response 498 may integrate information from more than one service module.

In one aspect the present invention encompasses a system including: a routing module that receives and routes requests to an appropriate response module; a plurality of response modules registered with the routing module for responding to different types of requests; a plurality of spatial servers from which the response modules retrieve spatial information to be used in responding to the requests; and an interface for adding response modules to the system. The interface further includes methods for publication of information regarding the response module to the service manager, also referred to as the routing module, including information required for starting or terminating a particular response module, and methods to allocate or deallocate resources.

The system of the present invention further encompasses: a servlet within a platform independent implementation (JAVA). The servlet is in communication with a service catalog to determine or update available services/response modules and a user profile and geographic database. The servlet also provides support for one or more of HTTP/POST, XML, and SOAP, while being adapted to forward requests to a registered response module, which module, in turn, receives spatial information from a spatial server, and sends results to the routing manager for generation of the response to the request.

The system of the present invention also encompasses the functionality of a response sent to a different address than the address from which the request was received.

The system of the present invention further encompasses a plurality of spatial servers that may include one or more of: a routing server (Routing J Server™) for obtaining one or more routes between a starting point and a destination; a geocoding server (e.g., MapMarker J Server™) for providing geocodes corresponding to an address; a geodecoding server (e.g., MapMarker J Server™) for providing an address corresponding to a geocode; and a mapping server (MapXtreme server™) for providing maps as image files encompassing specified geocodes, locations, or addresses.

The system of the present invention also encompasses at least one service module comprising: an interface for receiving a request; an interface for generating a response to the request; and an interface for initializing and shutting down the service module.

Embodiments of the system of the present invention may also encompass services such as obtaining one or more records containing a geocode corresponding to an address; obtaining an address corresponding to a geocode; obtaining a route to a destination; obtaining a position for a mobile device; obtaining the identity of a location; obtaining one or more geographic features near a location; and a person profile data; providing a map corresponding to a location; a coordinate geometry service for carrying out geometric calculations and measurements; performing coordinate transformations; providing traffic related information; generating enterprise specific maps; and providing an enterprise profile.

Embodiments of the system of the present invention may also encompass Pass-Thru Service, which refers to a service provider creating a service request specification that contains a request of another service or server (typically encoded in XML as well). The Pass-Thru Service facility extracts a request content (or payload) from the request document in the original request envelope, passes this payload to another server (third-party server) that accepts the XML request, processes the payload, and wraps the response payload back into an envelope for returning the response document. Thus, the integrated location-based service platform, or its modules, may not only receive requests, it may also make requests and process the response thereto.

Figure 5:
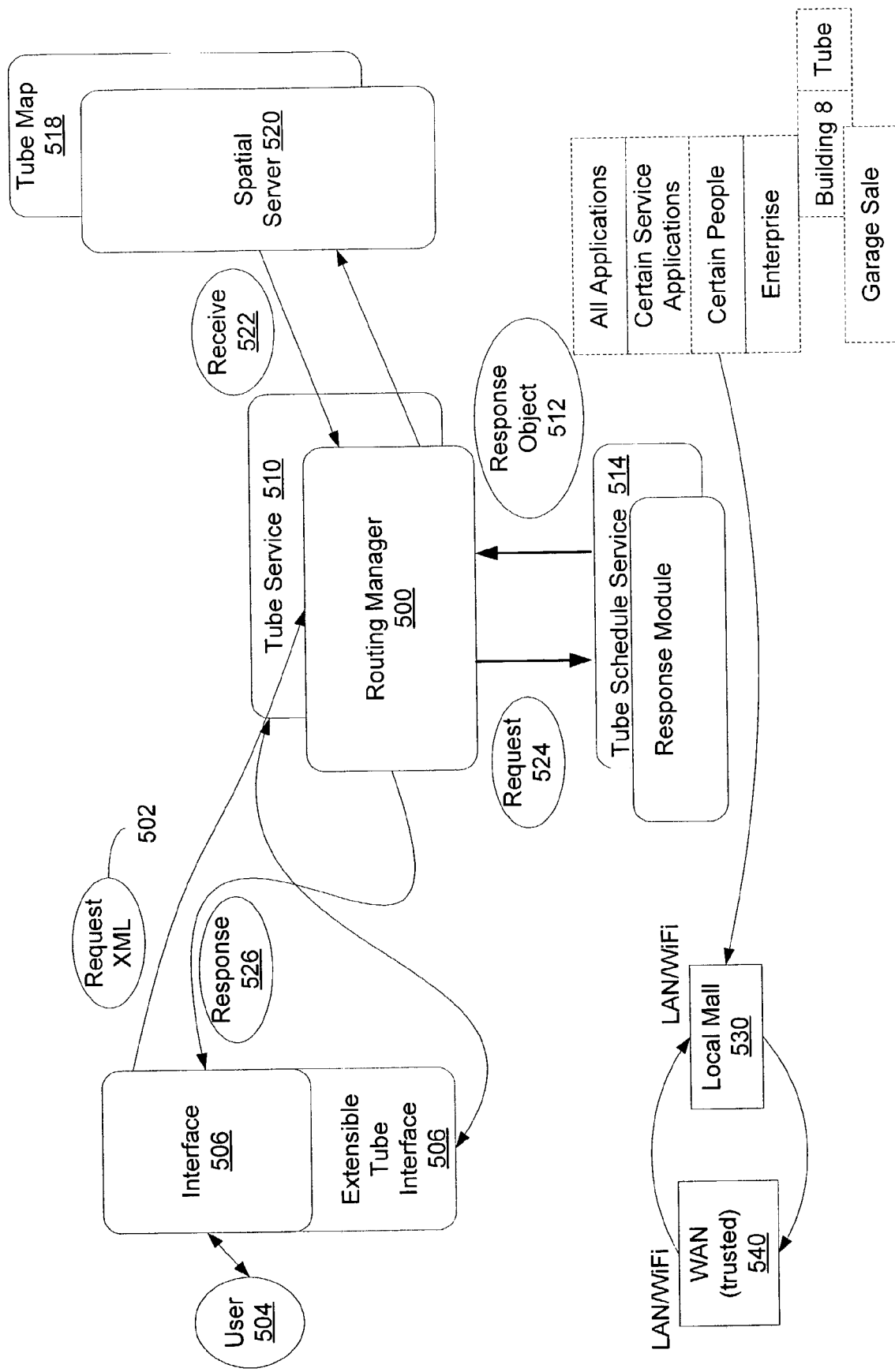
FIG. 5 is an illustration of an integrated location-based service platform for providing location based services that integrate the London subway with vehicular traffic routes and pedestrian traffic routes.

FIG. 5 illustrates an example of an integrated location-based service platform for providing routing information in London, U.K. The integrated location-based service platform preferably comprises service manager 500, which receives requests 502 from user 504. User 504 may request a route that could include walking, driving and subway legs for providing the lowest cost, shortest distance, and/or shortest time or other specifications. Alternatively, a default specification may be provided to the user. User 504 sends request 502 via interface 506, which allows additional requests to be sent as well. Interface 506 is extensible and includes tube (i.e., subway) interface 508 for communicating with tube service 510 underlying service manager 500. Extensibility denotes providing interfaces to allow anyone including third parties to extend the functionality of the system. Thus if a subway routing module for a city was available, it may be added without the need for express integration for incorporating the functionality directly into the routing modules. It is preferred that such modules are registered only following an authentication or a limited gate-keeping step to ensure that the module provider is trusted, as well as retain a measure of control over potential providers of service modules. To the user, the added functionality appears seamlessly integrated.

Service manager 500 sends a request object 512 to tube schedule service 514, which is part of service providers 516. Tube schedule service 514 requests information from tube map server 518, which is one of the spatial servers 520, and receives information 522 in response thereto. This information enables service provider modules 516, such as tube schedule service 514 to generate response object 524 for service manager 500 in response to processing request 502. Service manager 500, in turn, generates response document 526 for sending to user 504 via interface 506.

Notably, FIG. 5 also illustrates that service providers 516 (response modules) may provide various services that may have security components as well. For instance, a service provider providing security or personal profile information may provide permissions that enable all users to (1) access one or more of all applications; (2) access some services by way of some applications only; (3) allow specified user to access specified services; or (4) characterize the profile of an enterprise.

In addition, the wireless carrier may provide additional services through intuitive and automated interfaces that allow a user to advertise event such as a garage sale. This service is enhanced in value by the smooth integration of the functionality for providing directions from existing modules integrated via the with directions to the garage sale generated in a customized fashion for individual users, such as user 504, based on use of the tube, walking and/or driving. User 504 may be provided information, for instance that regarding the garage sale, in response to detecting user 504 via LAN/WiFi 530. Such detection triggers, preferably with the consent of the user, the obtaining of profile and preference information for user 504 over a secure Wide Area Network (WAN) 540. In addition, user 504 may be presented with a choice of or information about malls and supplier stores 550 in the vicinity, along with directions to a supplier store from a location of user 504. All of these activities are preferably carried out automatically, thus integrating user 504 with the surroundings.

Figure 6:
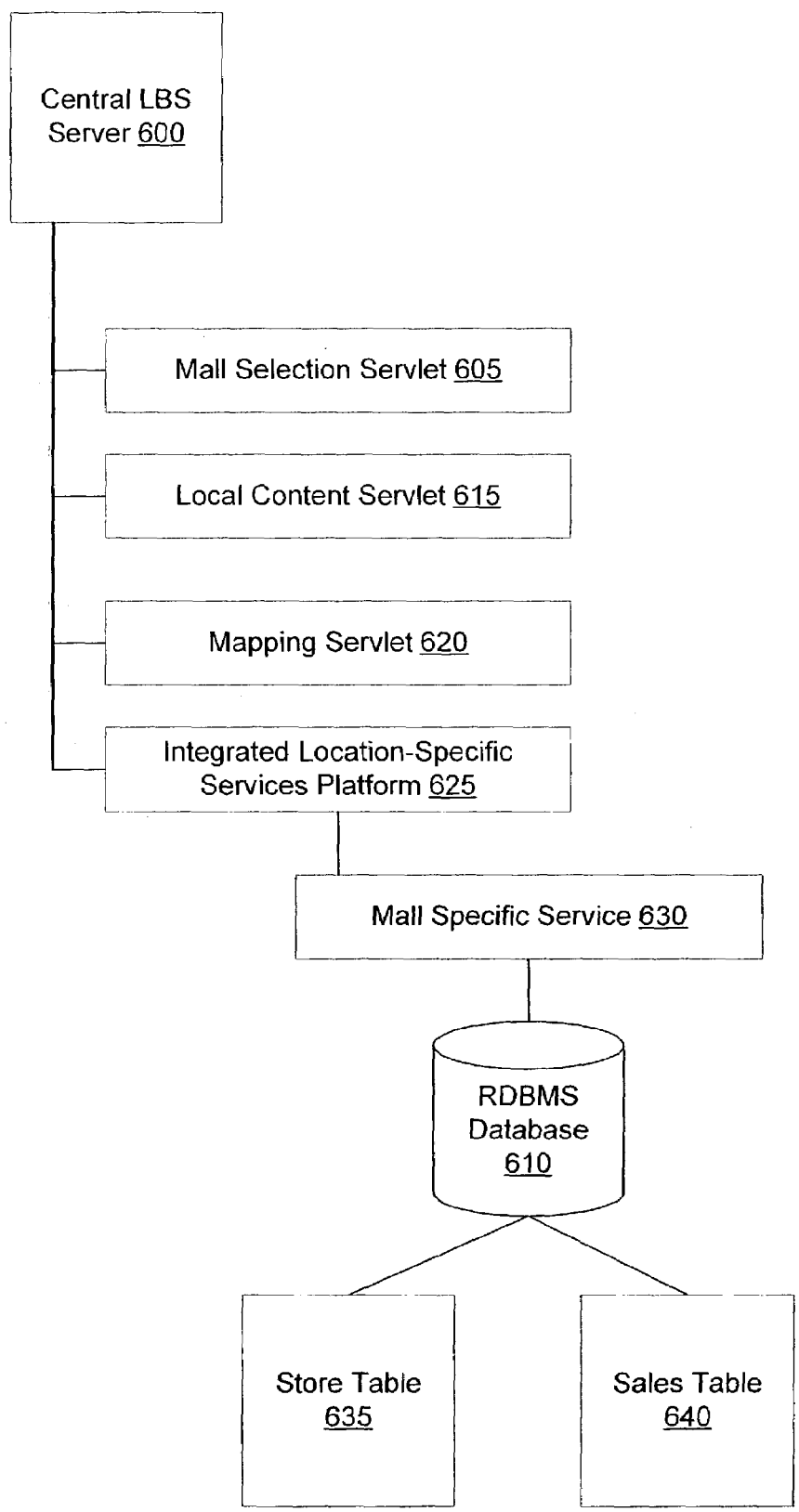
FIG. 6 is an illustrative embodiment of the present invention that includes a communication system comprising a central server and a peer-to-peer location-information based information system.

Thus, the choice of mall stores, as is also further illustrated in FIG. 6, may be provided by a wireless carrier along with information about a garage sale in the vicinity. Notably, WiFi is not necessary for accessing information about a garage sale or a store in a shopping mall. Such information could be provided by way of local data going back through the carrier to the device being carried by the end user. The connection is still preferably point-to-point in the sense that a handoff request is given to the system(s) to hold the mall information even if the mall returns it back to the carrier for delivery rather than delivering it directly. Garage sale advertising functionality may interact with a carrier in a similar way.

The wireless provider (or some other agent) brokers an arrangement with a person wishing to hold a garage sale and the person wishing to have the garage sale (or any other similar activity) provides the details for the garage sale by interacting through an interface managed by the carrier or other agent without any need for direct intervention by the carrier or other agent. In some embodiments there may not even be a charge for such a service, but likely there will be a charge if that matters. The party advertising the garage sale provides an address for where the garage sale is being held, the carrier or other agent knows the location of the sale and can therefore provide the end user wishing to know about any sales in the vicinity of the end user. The actual details about the selected sales are then delivered preferably in response to a user request.

WiFi functionality is likely to be used if a user were looking for a sale rather than push sales related information to a user. Preferably, mobile users, for instance, moving in a vehicle or walking through a neighbourhood, are sensed via carrier detection and interaction. Thus, the provider of the 'sale' or any event in general may provide advertisement and notice of the event along with directions and other sophisticated functions without the need of any programmer by merely using a friendly user-interface to guide them through the setting up of such a service to make their local event detectable through the carrier or other agent.

In another aspect, the present invention comprises standalone services that may be provided by stand-alone service providers or by service providers that may be accessed both through an integrated location-based service platform and directly. An example is provided by a peer-to-peer location-based information system (LBS) in which locally relevant information may be maintained by local entities, such as local businesses. In another aspect, the present invention comprises a combination of location-based service and personalization, in which locally- and personally-relevant information is automatically provided to users based on their location and previously-stored personalization information. In a preferred embodiment, the peer-to-peer aspect and the personalized localization aspects are combined into a single system. In one such preferred embodiment, a central server maintains personalization information in the form of a customer profile, and maintains a list of servers providing locally relevant information, and automatically refers the user to a server providing information relevant to the user's location. The profile is used to refer the user only to information that matches the user's profile, and/or to provide the server providing locally relevant information with the ability to personalize the information for the user.

In a preferred embodiment, the present system and method comprise a site adapted to host one or more location-based services. A Service Provider Java API is preferably provided, which is a set of Java interfaces and classes for development of new services. New services can be deployed to the existing set of services hosted by a the site. Once deployed, services may be accessed from the outside world.

In order to deploy a new service, a service provider preferably implements three main interfaces: ServiceProvider, ServiceRequest, and ServiceResponse. ServiceProvider is the main interface to a provider. At initialisation, a ServiceProperties object is passed into the provider so configuration information specified in the Service Catalog can be utilized. Since initialisation is only a one time operation, global information necessary for performing service requests in a multi-threaded environment should be cached. At shutdown, the provider preferably de-allocates resources so to avoid memory leakage and/or holding up unnecessary resources (e.g. database connections). These tasks are performed by methods such as init( ), shutdown( ), getServiceRequest( ), and perform( ). The ServiceRequest contains parsed information of a request document. The provider creates the ServiceRequest object based on the input request document. This object parses the content of the document and provides information for rendering a request. The ServiceRequest is passed into the provider at a later stage for carrying out the service request. Implementation of this interface also provides capability to create request document conformaning to a suitable DTD, such as the miAwareServiceRequest DTD, which includes specifications for methods (e.g. setDistanceUnit( ) of the RouteRequest object) that are available for filling the content of this document including setters & getters to XMLdocument( ).

A ServiceResponse object contains results of a service request and is returned after a service is rendered. This object also provides methods for publishing its content to a XML document conforming to the miAwareServiceResponse DTD. In addition, this object is also able to parse its own response XML document and provides "get" methods (e.g. getTotalTime( ) of the RouteResponse( ) object) for retrieving the content.

If other third-party JAR files are required, they are also bundled together with the implementation class(es) of the ServiceProvider interface. The request and response DTDs, their sample XML documents, and Javadoc for the ServiceRequest and ServiceResponse implementation classes are also made available.

In another aspect, a client Java API is provided, which comprises a set of helper classes grouped by services, which assist Java application developers to publish service requests and retrieve information from a response document. Helper classes which assist development of client applications include constructing service requests as XML (e.g., String req=routeReq.toXMLDocument( );), submitting requests to miAware™ Service Manager (e.g., InputStream is=miAwareConn.submit(req);), and parsing results from service response XML (e.g., RouteResponse res=New RouteResponse(is);). The client is super thin due to no dependency on core software. Typically, the client needs W3C compliant SAX/DOM parsers (which are provided by many entities such as Sun®, Oracle®, IBM®, etc).

Turning to the form of response and request specifications, some useful features are readily apparent. These messages are encoded in a markup language, and include a location of interest and a plurality of nested tags, preferably conforming to the XML specification, such that the message comprising an outer tag indicates a first service. The inner tag is associated with a plurality of attributes for processing the request so that at a user interface (supported in a thin client) one or more fields corresponding to the plurality of attributes are presented to receive data for providing the first service or the result of a service request. The location of interest may be provided by many different means, such as user input, a base station location signal, an address, a geocode, two or more base station signals detected by a mobile phone, and two or more GPS signals. As noted previously, a part of the request is forwarded to a service provider module by using the nested tag structure.

In another aspect, the tags correspond to requests for services such as routes to a specified destination, a list of local servers for obtaining local information, an ordered list of events, a list of products or services, a location, a map, a list of nearest geographical features, transformed coordinates, an event matching service, a traffic monitoring service, a peer-to-peer communication shopping service, a user profile service, and a location aware service. The attributes provide data for an address, authenticating information, personal preference information, event description, a route, geographically accessible locations, product description, traffic conditions, weather conditions, a map, and coordinates transformation.

In a preferred embodiment of the invention, a central LBS server in the peer-to-peer system maintains a database of local-content servers (peers) providing locally relevant information that is spatially indexed so as to permit the network addresses of the local-content servers to be resolved based on a provided indication of the location of a user. Such a database may include records indicating categories of content available from at least a portion of the servers.

When a user of a mobile device accesses the system of the present invention by running a client program for interacting with the LBS server, the LBS server is provided with an indication of the user's geographic location. The client system may comprise a cellular telephone comprising a location determination system such as GPS or any mobile positioning technology, and Java. Using the indication of the user's geographic location, the LBS server queries the database for local-content servers providing information or services relevant to the area of the user's geographic location. If the results include only one local-content server, the user is preferably re-directed to the local-content server. If the results include more than one local-content server, the user is preferably provided with a list of links to local-content servers.

The LBS server may not include information about the content or services provided by the local-content servers, thus avoiding the need for updates when the content or services provided by local-content servers are updated. In an alternative embodiment, the LBS server database includes records indicating the categories of content or services provided by at least a portion of the local-content servers.

The information and/or services provided by local-content servers are preferably maintained by entities, such as businesses, that also provide goods and/or services through facilities physically located near the geographic locations for which the local-content servers provide information and/or services. There is no requirement for the local-content servers to be physically located in or near geographic areas for which the local-content servers provide information and/or services. However, in one preferred embodiment, local-content servers are maintained locally by area organizations, such as shopping malls, and may be accessed by local-content providers, such as stores within the shopping mall. Preferably, wireless access is provided for maintenance by local-content providers.

Personalization services may be provided by the LBS server, or by the local-content servers, or both. In a preferred embodiment, personalization services are provided by local-content servers, which act upon information provided from a customer profile maintained by the LBS server operator. In this way, only personally relevant local content is provided to the user. Personalization services are preferably provided by Mapinfo® Corporation's miAware™ profile module. Servers running MapInfo®'s miAware™ also preferably provide LBS services and local-content services.

An illustrative embodiment of the present invention includes a communication system comprising a central LBS server, a plurality of local-content servers called, a central database (repository) attached to the central LBS server containing one or more URL of each local-content server, a plurality of local-content databases (repositories) attached to each local-content server, and a map server. Each local-content database preferably comprises product and sales information of stores in a shopping mall. Each central LBS server and local-content server may, for instance, be implemented as an Apache Tomcat web server with Java Servlets with the databases or repository being an Oracle database accessed by Servlets via JDBC. An example map server preferably comprises MapInfo® Corporationg's MapXtremeJava™ 3.1 servlet for retrieving maps for specific local malls, as shown in FIG. 6. Collaborations of these system components are shown in FIG. 7 and FIG. 8.

Figure 7:
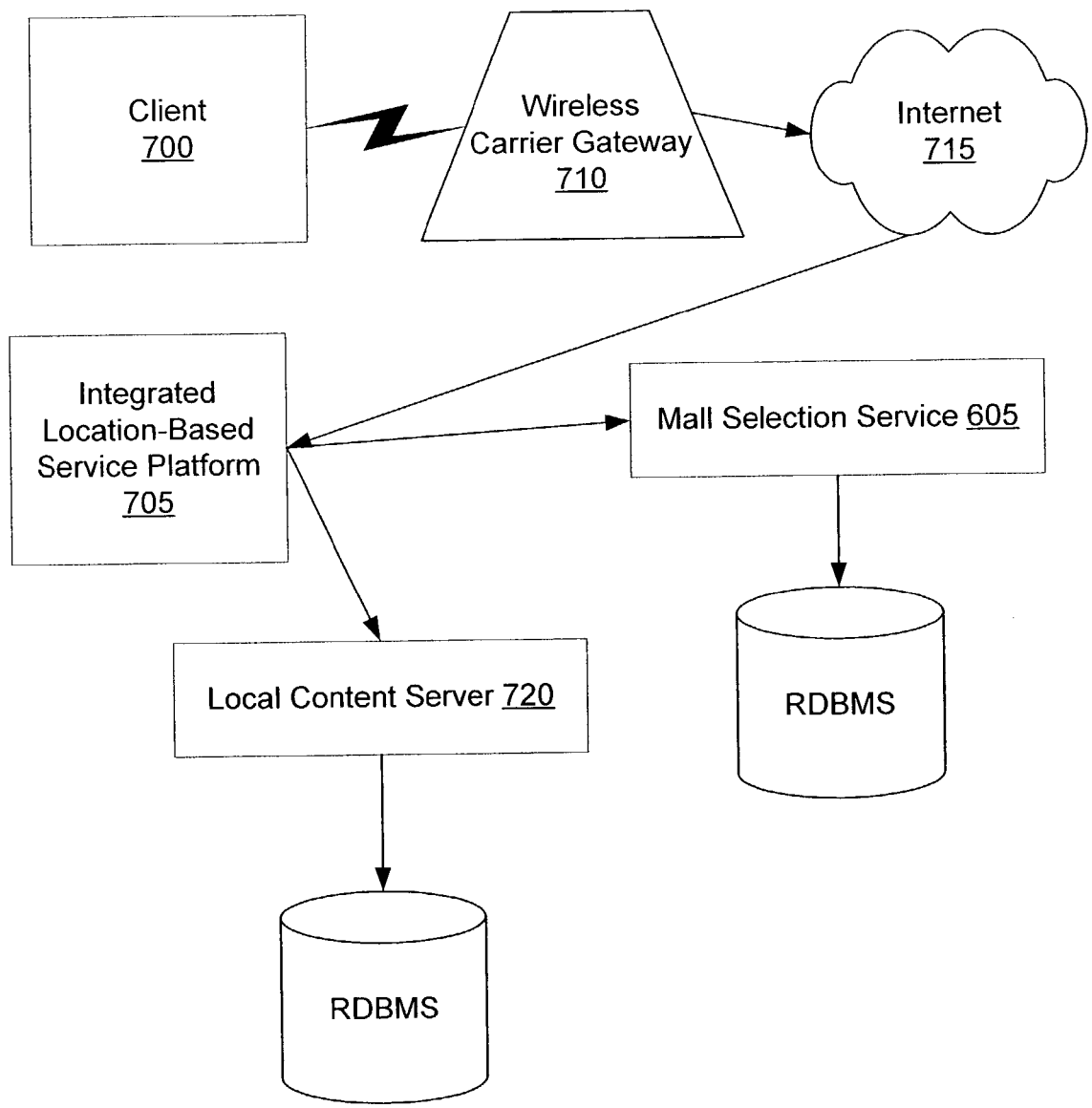
FIG. 7 is an illustration of the interactions between a mobile user and a peer-to-peer system for providing location based services.

In phase one, illustrated in FIG. 7, a mobile user 700 sends a request to the central LBS server, hosted by integrated location-based service platform 705 via a wireless carrier gateway 710 and Internet 715. Notably, the central LBS server may be hosted independent of integrated location-based service platform 705 as well. The request seeks the address of local-content servers, possibly including local-content server 720 serving the user's geographical location. The request preferably further comprises an indication of the geographical location of the mobile user, such as the user's approximate latitude and longitude, although such an indication is not required for practicing the invention since it may be obtained automatically via a location determination service by triangulation or other means.

Upon receiving the request, central LBS server 600, illustrated in FIG. 6, preferably implemented as a collection of servlets, forwards the message to mall selection servlet 605 residing in server 600. Mall selection servlet 605 includes a listing of various malls and may be connected to an integrated location based service platform. Mall selection servlet 605 then parses the message to obtain the user's geographical location and queries database 610, with the aid of mall specific service 630, for the name and URL of local-content servers, such as local-content server 720 of FIG. 7, serving the user's location. Central LBS server 600 then responds to the request with a list of names and URLs of the local-content servers serving the user's location. As shown in FIG. 6, central LBS server 600 may be a standalone server including store information and administrative operations capability via mall specific servlet 615, mapping and directions from mapping servlet 620 and local service integration by integrated location-specific platform 625. Alternatively, mall specific servlet 615 may serve as the front-end to an integrated location specific services platform. FIG. 6 also shows store table 635 and sales table 640 for providing various services, and which tables are preferably stored in RDBMS 610.

In phase two, the mobile user establishes contact with specific local-content server 720, by sending a request with privileges of either a mall administrator or a simple end-user. If only one local-content server was found by central LBS server 600, the mobile user client may be redirected to local-content server 720 without the user's intervention. Otherwise the user is presented with a display comprising a list of local-content servers servicing the user's location. The list may be filtered based on personalization information stored on the user's client 700 or provided by central LBS server 600.

FIG. 8 further illustrates interactions between clients 800 and 840 and an integrated location-based service platform performing multiple functions. Client 800 sends a request to a central operations center, e.g., using a wireless link, and is connected to central LBS server 810 (which could also be an integrated location-based service provider). The request may comprise a mall map, store location, sales/specials, updating of sale data and the like. Integrated location-based service provider 810 connects to repository 815 to retrieve necessary information, and may further request second local central LBS server 820, if required, for a map, a specific location, or specials. Second central LBS server 820, in turn communicates with a map service 825 or specials service 830, in communication with repository 835 for determining available specials. In addition, client 840, being in the vicinity, directly communicates with second central LBS server 820 for services.

In this example, users can retrieve sale information for stores in the malls in their area. Sale information for each store is maintained by a store administrator for each store. A store administrator can get, add, delete and update sale information for the administrator's store, while an end-user can, preferably, only retrieve sale information. Sale and authorization information is stored, for instance, in two tables in the local-content server database, stores table 900 and sales table 910, as shown in FIG. 9. The stores table 900 comprises authentication (password) information for stores in the mall. When a user attempts to administer sale information for a store, the user is prompted for a password. If the password matches the password for the store in the stores table 910, the user is allowed to administer the store sale information stored in the sales table for that store. FIG. 10 is a flow chart indicating the actions available to a store administrator, which allow remote monitoring of stores with the possibility of conducting inspections and the like if required.

During step 1000 in FIG. 10, a user with store administrator privileges chooses a mall to access. Next, during step 1005, the store administrator is presented with a secure login screen. Control passes to step 1010 in the event the login fails, and preferably at least a limited number of retries are allowed by transferring control to step 1005. Limiting retries is preferred, but not required, since it counters denial of service attacks and other security breaches.

From step 1005 control flows to step 1015, during which sales for a target store may be retrieved. In response, or otherwise, the administrator may elect to, during step 1020, add, update, or delete a sale. For these illustrative operations, control flows to step 1025 for entering a new sale, which may be approved in step 1030 or fail during step 1035; step 1040 for deleting a sale, which may be approved in step 1045 or fail during step 1050; and step 1055 for selecting a sale for updating during step 1060, which may be approved in step 1065 or fail during step 1070 respectively.

FIG. 11 is a flow chart indicating the actions available to a user who has been provided with a list of local-content servers by the central LBS server or may have received a splash screen image during step 1102, possibly of a promotion, advertisement, or a message indicating start of an application. During step 1100, selection or a response results in a user receiving a mall list selection followed by, during step 1105, selection of a store search method. The user may, during step 1110 find a store by name; or during step 1115 find stores based on products. Control flows to step 1120 from step 1115, so that a user may find all stores by a specific product category or to step 1125 for finding stores by their typical product categories with selection of a store by product during step 1130. Control following store selection flows from steps 1110 and 1130 to step 1135, during which the display of a target store's sales list information is selected. Control then flows to step 1140, during which sale information is displayed. Directions to or maps for the target store may then be obtained during steps 1145 and 1150 with various degrees of specificity, denoted by selection of a zoom parameter value.

FIG. 12 indicates the corresponding Java panels used by the example application illustrated in FIG. 11. Thus, step 1102 corresponds to map panel 1202, which is shown in FIG. 13, step 1100 to selection panel 1200, and so on. Corresponding panels in FIG. 12 are labeled in a manner similar to the labeling in FIG. 11. The individual user interface is depicted in FIGS. 13-22, which are described in greater detail next.

In FIG. 13, corresponding to 1202 and 1102, the user has started a client application on his mobile device, preferably a java-enabled cell phone using a mobile positioning system. When the user selects "OK" 1301, a request including an indication of the user's location is sent to the central LBS server. The central LBS server responds with a list of local-content servers serving the user's location, which is displayed on the user's client system as illustrated in FIG. 14, corresponding to step 1100 and panel 1200. In this example, two malls are near the user, the Crossgates mall and the Colonie Center mall. If the user selects the Crossgates mall 1402 and selects "OK" 1401, the user is presented the display illustrated in FIG. 15, which corresponds to step 1105 and panel 1205.

FIG. 15 illustrates a user interface that allows the user to indicate whether the user wishes to enter a store name, or to select a store by the item offered on sale. If the user selects "Sales by store name" 1502, and then selects "OK" 1501, the user is presented a text-box display for entering a store name. If the user selects "stores by sale item," and then selects "OK" 1501, the user is presented with the display illustrated in FIG. 16, which corresponds to step 1115 and panel 1215.

FIG. 16 illustrates a user interface that allows the user to indicate whether the user wishes to enter an item name, or to select an item by category. If the user selects "sale item by name" 1603 and then selects "OK" 1601, the user is presented a text-box display for entering an item name. If the user selects "sale item by category" 1602 and then selects "OK" 1601, the user is presented with the display illustrated in FIG. 17, which corresponds to step 1120 and panel 1220.

FIG. 17 illustrates a user interface displaying categories of items for which the mall-server contains sale information, which user interface also allows the user to select a sale category. If the user selects "Dress Shoes" 1702 and then selects "OK" 1701, the user is presented with the display illustrated in FIG. 18, which corresponds to step 1130 and panel 1230.

FIG. 18 illustrates a user interface displaying a list of stores having sale items in the mall-server database in the category selected by the user, and allows the user to select a store. If the user selects the store "DSW" 1802 and then selects "OK" 1801, the user is presented with the display illustrated in FIG. 19, which corresponds to step 1135 and panel 1235.

FIG. 19 illustrates a user interface displaying sale items in the local-content server database for the DSW store selected by the user. If the user selects the item "Dress Shoes" 1902 and then selects "OK" 1901, the user is presented with the display illustrated in FIG. 20, which corresponds to step 1140 and panel 1240.

FIG. 20 illustrates an interface displaying information about the sale item selected by the user, which user interface also allows the user to request a map showing the location of the store relative to the user. If the user selects "OK" 2001, the user is presented with the display illustrated in FIG. 21, which corresponds to step 1145 and panel 1245.

FIG. 21 illustrates a user interface displaying a map showing the location of the store relative to the user and allowing the user to request a zoomed-in map showing the store location in more detail. The user's location is shown as a pair-of-shoes icon 2102, and the store's location is shown as a dot icon with the name (or abbreviation) of the store 2103. The map is automatically scaled to show both the user and the store locations. If the user selects "OK" 2101, the user is presented with the display illustrated in FIG. 22, which corresponds to step 1150 and panel 1250. FIG. 22 illustrates a map zoomed-in to show the store location in more detail.

Local-content server servlet 720 (or 615) preferably provides JAVA calls for both administrators and end users. These calls include: getSalesByStoreName(<store name>); getSalesByStoreLogin(<password>);deleteSale(existing sale record);addNewSale(sale to create record); updateSale (existing sale record in DB); getStoresByProduct(<product name>); and getStoreinfo(<store name>). In alternative embodiments additional or alternative calls may be provided for allowing both administration and browsing by users based on their respective privilege levels.

Thus, location based services can be offered in accordance with the present invention in an integrated location based service platform or as stand-alone services. The services range from sales promotions, discovering nearby stores, locations to matching events and generating maps using various modes of transportation.

Thus, an integrated location based service platform may further include a plurality of third party servers such as those accessible at a network address corresponding to a response to a request for at least one geographic feature. In addition, the geographic feature is preferably an address of a location-based-information-system server associated with a user location, which preferably provides: personalization data as part of the person profile service; and links to one or more local servers associated with the user location and corresponding to input profile data or a user profile. Furthermore, the location-based-information-system server preferably redirects a user to a first local server, or provides a choice of local servers.

A local server may provide additional user profile information, and information about one or more of sales, promotions, availability of a product or service, alternative sellers of a specified product close to the user location, or alternative providers of a specified service close to the user location.

In another aspect, a user interface responsive to one or more taps or strokes on a pad, one or more clicks of an input device, or a voice command is provided to a client. Such a user interface is also useful for making subsequent requests (such as using a nearest geographic feature to get to content of local stores on local servers and directions to a store using the routing service).

Location Sensitive Event Service

Yet another example of location based services is a location sensitive event service, such as the CoolEvent® service offered by the Mapinfo® Corporation, which service finds a list of events that are of interest to a service subscriber or other user, based on the user's location and preferences stored in a profile. This service, like the peer-to-peer location based service may be offered in association with an integrated method and system, such as the miAware™system offered by the MapInfo® Corporation, described previously, or be provided as a stand-alone service. The returned events are sorted by distance between the user's current location and an event place. A demographic analysis is performed to returned selected events.

The design underlying the location sensitive event service is not limited to use in locating events, but, without limitation, may also be used for a variety of other applications, such as wireless advertising, or in generating matches for dating services. In another aspect, the design underlying the location sensitive event service is also intelligent such that increased use of the service results in refining the user profile without additional end user input. Moreover, the present system and method may also be used, for example, in a dating service to determine whether to introduce individuals based on their profiles.

In another aspect, the location sensitive event service may also provide content filtering capabilities in the user profiles—i.e., options to allow users to preselect content which they would like to find, either on demand or as a result of polling.

FIG. 23 illustrates an exemplary architecture for an embodiment of the location sensitive event service. User 2301 subscribes to the location sensitive event service provided via servlet 2305. Web scraper 2320 culls possible events from event sources 2325 to generate events in event database 2330. Event database 2330 is processed in accordance with demographic event model 2310 to generate a list of suitable events for the servlet 2305. At the user end, subscribers 2335 provide information 2340, which is used to augment user profile database 2345 and generate and refine demographic user model 2315.

Servlet 2305 matches the user profile with the event profile to generate an ordered list of events that may be provided to user 2301.

Information 2340 preferably includes personal preferences such as music, art and food and any other preferences or parameters of interest. This information is used by the CRM engine to sort events matching a user's interests. An example set of personal preferences is as follows:

Gender, Age, MusicPref, ArtPref, SportsPref, FoodPref, AlcohoPref, SexualOrient, and Religion.

Additional personal information that may be relevant includes:

Personal ID (linked with personal profile)

Residence Type: single family/town house/condo/etc

Resident Type: owner/renter etc

Employment Status: employed/unemployed etc
Type of occupation: student/blue collar/service/white collar/executive
Marital Status: married/single etc
Kids in household (and their respective ages)
Partner Status: none/steady/not steady
Car Access
Interest in a specified service, etc.
Example behavioral characteristics (with optional groups) may include:
What kind of music do you like?
What kind of sports do you like to watch?
What do like to do on a Saturday night?
Are you interested in meeting folks to date?
If, yes . . . what type of folks? And any additional questions.

Another view of an architecture providing a location sensitive event service, operating as a customer relation management tool, is illustrated in FIG. 24. Client 2400 communicates, for instance over the web using web protocols such as HTTP and with markup languages like XML to specify various interfaces, with location sensitive event service servlet 2405. Client 2400, for instance the CoolEvents™ client supported by MapInfo® Corporation, may be a J2ME MIDlet and, furthermore, it may be based on existing MLS services. This allows most of the basic functions of MLS such as mapping, routing and geocoding to be also used.

Location sensitive event service servlet 2405, in turn, communicates with profile database 2410 of mobile location service subscribers to obtain personal preferences for a particular user. Such personal preferences may be generated with the additional aid of personal extension database 2415. Location sensitive event service servlet 2405 may be implemented as a allows stand-alone implementation, although, integrated location-based service provider 2420 may be used for relation management service as well. Alternatively, optional customer relation management engine 2425, designed specifically for this application or a functional equivalent, can directly interact with location sensitive event service servlet 2405 instead of integrated location-based service provider 2420.

An example of a CRM service is found in the MapXtend™ service provided by the MapInfo® Corporation. This service accesses a customer relation management (CRM) service, e.g., aCRM service of an integrated location based service platform, for instance miAware™ system provided by MapInfo® Corporation. Optionally, a CRM engine specifically designed for this purpose can be made available, including as an alternative or to supplement the miAware™ system.

The illustrative miAware™ service for CRM mentioned previously in the context of FIG. 24 accepts an XML request which includes login ID and current location of the client. The service retrieves personal information through miAware™ profiler using the login ID, then gets personal preference data. An XML element is then created and sent to the CRM engine. The returned list of events is sent back to the client. The MapXtend™ service typically includes the following functions.

Retrieving personal preferences information from a location service, such as MLS, profiler database, and possibly additional databases. If a database keeps only limited personal information, then, advantageously, an additional database may manage personal preference data. This database may be linked to the profiler database by, for instance, the user's login name.

Converting the personal preference data into XML, or another markup language suitable for sending information, and sending it to, for instance, miAware™ aCRM service. If this is not available, the location sensitive event service may send the data directly to a CRM engine.

Returning an event list, to the client, if desired, this event service event list can be returned as MXTD DAR (representing the MapXtend specifications).

Some specific MXTD commands are listed below to illustrate an implementation for a location sensitive event service:

Start: a command to start a session. If the user has already logged in, e.g., with miConnect, the user's profile may be automatically retrieved, otherwise a login by the user provides a login name and password. Alternative authentication methods may also be employed, if desired, to start the session. Start command preferably triggers a search by the CRM engine to return an original recommendation of events for the user, in accordance with a current location (preferably the user's) and profile data.

Route_map: this command requests a map centered at a chosen event place, with, preferably, a routing line highlighted on the map.

directions: this command requests a textual, or an alternative such as Braille or audio, description of routing directions for the client to get to the event place.

Personal Preferences may be conveniently represented in a table, as shown below:

| ID | Sex | Residence | Resident | Employment | Marital Status | Partner | Car Access | Interest |
|---|---|---|---|---|---|---|---|---|
| Integer | Char | String | String | String | String | String | String | String |

Personal Preferences are advantageously stored in a preferences database that lists user preferences. A look-up table for coded preferences assists in accessing the database. Exemplary table entries may look like:

Personal ID

Preference code: codes are grouped (music, sports, activities . . . )

Preference rank, which are entered as

| ID | Preference Code | Preference Rank |
|---|---|---|
| Integer | Integer | Integer |
| Link to personal profile | Link to code look-up table | |

In personal preferences, a rank value is used to indicate the priority that the user gives to a certain type of an event category (e.g., basketball in Sports), this is an input value from the user. In the event match model, a score is calculated for the user on each event. This score is used to rank the events.

An example preferences Code Look-up Table is shown below:

| Preference Group | Description | Code |
|---|---|---|
| Music/Sports/ . . . | Pop/Rock . . . | |

Following subscriber registration, preferably including a password, user registration for the present session may be accomplished using one or more web-pages and an appropriate wizard. In an exemplary embodiment the first page may be a modified version of the current miProfiler™ provided by Mapinfo® Corporation. A second page may collect additional personal information, advantageously (but not necessarily) in a way similar to the first page. A third page collects personal preferences. The user selects an option and ranks it. Even though expandable DHTML elements may cover many preference classes (for instance, music, sports, sports viewer, activities, alcoholic beverages and movies), some classes may result in a long list. A scrollable list box may hold the selections, with buttons for the user to select the items into another list box in which the items are sorted according to which button is clicked.

If desired, changes may be made to the above address panel to include residence/resident types.

An event database is also preferably built and updated for providing a location sensitive event service as illustrated in FIG. 23. A real world event database should be dynamic and typically changes daily. Subscribing to an external database such as Toronto.com is a possible maintenance mechanism with the aid of an exemplary client program to access such an external service. A web scraper designed to scrape a particular website, e.g., Toronto.com, may be created to access event data from the website.

Some example profiles are: 1) a 26 year old, male University of Toronto student on a Friday evening; 2) a 46 year old Bay street business man on a Friday night with/without the wife; 3) a typical Mississauga housewife with 3 children.

As shown in FIG. 24, an interface to an optional CRM Engine is also preferably provided. To this end, language-specific APIs (Java/C# etc) may be considered as well. An exemplary XML API may comprise the following input and output:

Inputs: three elements: personal data, preferences and address. Personal data preferably includes items required by miProfiler™ plus additional attributes. Preferences is preferably a sequence of preference codes and ranks.

In an output, a sequence of event elements is generated with each event element preferably including an event name, and a detailed description comprising a place, date and time.

In an exemplary embodiment, an event finder engine helps find, from the event database, the event or the top N events that best match a user's preferences. Numerical measurements that represent a comparison of events to a user's preferences may be determined. To compare an event with a person's preferences, both the event and the preferences should have a set of common attributes. This set of common attributes may be used to calculate the differences between an event and a personal profile. Before comparing, events and personal profiles are abstracted to form a vector of selected attributes. The process of defining the attribute set is a dynamic one that improves as more data accumulates in the user database.

To illustrate the computations underlying matching events to users, an exemplary calculation is presented next. It should be noted that the matching formulae may be varied as will be understood by those of ordinary skill in the art. In a preferred embodiment, qualitative attributes may be given numerical values for comparison purpose. For instance, 1 or 0 may be used for two-state attributes. For multi-state attributes, more consideration is preferable, since, for instance, if an event is good for single persons, then the event is more likely suitable for a divorced person than for a person with an unsteady partner.

In another aspect, attribute abstraction is possible in a location sensitive event service. Illustratively, with a personal preference set including a person's preferences on music, sports, sports to watch, movies, activities and beverage tastes, the preferences are divided into six (6) groups each of which may be given an equal weight of ⅙ points.

For each preference group, personal selections may be ranked. For instance, a person's musical preferences may be ranked as:

1, JAZZ (1.0)
2, POP/ROCK (0.8)
3, OLDIES (0.6)

Depending on the data accumulated, illustrative percentages may be assigned to these three music types as: (100%, 80%, 60%).

With a database of N events, each event being assigned attributes of six (6) types, e.g., music, sports, sports to watch, movies, activities, and alcohol/beverage tastes, since an event belongs to certain types, and may be more one type than another, weights may be assigned to each type. For instance, a concert could be assigned weights like:

Music=0.8
Sports=0.0
SportsWatch=0.0
Movies=0.0
Activities=0.2
Alcohol=0.0

Then, for each group of attributes related to each type, a list of true/false values (or 0, 1) are assigned to specify each subtype. Thus:

Oldies=1 (yes, it is kind of oldies)
Jazz=1
Country=0 (no, it is not country music)
. . .

Now scores for the events may be calculated as:
Preferences:
 Music (weight=0.16667): Jazz=1.0, Pop/Rock=0.8, Oldies=0.6
 . . .
 Activities(Weight=0.166667): go to the cottage=1.0, watch a video at home=0.8, go to a restaurant with friends=0.6
Event one:
 Music (weight=0.8): Jazz=1, Pop/Rock=1
 Sports (Weight 0.0)
 . . .
 Activities (Weight=0.2): go to a music concert=1, go to the (live) theatre=1
Event two:
 Music (weight=0.8): Oldies=1, Pop/Rock=1
 Sports (Weight=0.0)
 . . .

Activities (Weight=0.2): go to a music concert=1, go to a restaurant with friends=1 (the event occurs in a restaurant)

And,

Scores

For event one:
  Music score=1.0 (Jazz met)*0.16667 (pref weight)*0.8 (event weight)
  . . .
  Activities score=0.0 (none matches)
  Final score1=0.133336

For event two:
  Music score=0.8 (Pop/Rock met)*0.16667 (pref weight)*0.8 (event weight)
  . . .
  Activities score=0.6 (go to a restaurant with friends met)*0.16667*0.2 (event weight)
  Final score2=0.1066688+0.0200004=0.1266692

To demonstrate the principle, but not as a limitation on the scope of the invention, the following attributes are used:

Age: age may be divided into age groups of <18(0), 18-25(1), 26-35(2), 36-45(3), 46-55(4), 56-65(5), and >65(6). If the person's age falls into the event's age range, match=1, otherwise each age group jump decreases 1/6 points. For example, if the persons age is >65 (6) and the event is for person between 18-25 (1), then the age point will be: 1−(6−1)/6=1/6.

Sex: match=1, not match=0

Similarly, an event is also assigned the following attributes:

Bundled Demographic data including marketed bundles such as Psyte™: two psyte codes may be compared directly to show the closeness between them.

Marital status: single(0), widowed(1), divorced(2), separated(3), non-steady partner(4), steady partner(5), common law(6), married(7).

Employment status: full time employed (10.1), part time employed(10.2), full time student (20.1), part time student(20.2), unemployed(30). In calculating the score, if the difference between the event and the user is greater than 1.0, 1.0 may be used.

Car access: yes=1, no=0.

Top three music: A model that compares the choices may be employed to take into account music type as well as sequence of choices.

Top six favorite sports to participate: same as music.

Top three sports to watch: same as music.

Top three things to do on weekend night: same as music

Alcohol taste: drinking is potentially significant and may be ranked, for instance as very important(0), common (1), not very important(3), don't like(4).

Top three movie taste: same as music.

Weighted Attributes

The abovementioned attributes are common to most events. For some events, some attributes are more important than others, or less important, or don't count at all. This may be adjusted by giving each attribute a weight.

Inputs

First of all, a vector of attributes for each user is generated, with a vector of same attributes for each event, resulting in two matrices:

vectors representing users, let it be matrix S(M, T), where M is number of users and T is number of attributes.

vectors representing events, let it be matrix E(N, T), where N is number of events and T is the same as above.

Algorithms standardize the two matrices: S->ZS, E->ZE. Standardization may use all records in the database.

for a specific vector in matrix S, calculate its scores on all attributes by comparing each vector in matrix E, as follows:

Score(I, j)=$\Sigma(ZS(I,k)-ZE(j,k))^2$

Where:
  I—index of matrix ZS, $0<=I<M$
  J—index of matrix ZE, $0<=j<N$
  K—index of attribute k, $0<=k<T$ Standardization of Personal Preferences A standardized vector is a vector that is scaled to the means of all possible values. Since the comparison is carried out between two attribute vectors for an event: event attributes and preference attributes, and attribute values are taken from a big range, they must be standardized to range in a common scale (e.g., 0.0 to 1.0, or 0 to 100) to make the comparison possible. To standardize a preferences vector, means and standard deviations of all attributes may be calculated using all records in the database. Then attribute k may be standardized as:

$$ZS(i, k) = \frac{[X(i, k) - mX(k)]}{X_{StdDev}(k)} \sum (ZS(I, k) - ZE(j, k))^2$$

Where:
  i—ith user in the database
  k—kth attribute
  ZS(i, k)—standardized attribute k of user I
  mX(k)—mean attribute k value of all users in the entire database.
  $X_{StdDev}(k)$—standard deviation of attribute k Standardization of Events may be undertaken after all the events are assigned attributes. They may be standardized by the same procedure as for personal preferences. However, this may not always be necessary since while assigning the attribute values, standardized values may be chosen.

FIG. 25 summarizes a process for generating ordered lists of events corresponding to user profiles. Profiles database 2500 is used to generate standardized profile database 2505 reflecting the distribution of various attributes that are part of the various profiles. The standardized profile database allows generation of attributed personal preferences 2530 that can be compared in the manner illustrated above.

Similarly, event database 2510 leads to attributed event profile 2515. The event and personal profile attributes are then subjected to multivarient comparison 2520 to effect matching by generating scores for each match. The scores for different matches are then compared 2525 to generate the ordered lists actually used to plan events, or to provide users with available event related details.

As is readily seen, event planning, generation of directions based on multiple modes of transportation, or managing/browsing stores in the vicinity are illustrative examples of location based services. Any combination of these services may be integrated using the integrated location based services platform in a dynamic manner since new services can be added, or existing services updated with the aid of the XML encoded specifications. Adding a service is as simple as choosing a unique name followed by publishing the service to the service manager in the specified manner. The limited rules for adding and publishing services, being themselves encoded in XML, are both easy to follow and readily available.

In another aspect, responses to requests for particular services may elicit information about sales, promotions, products, services, or events associated with a user profile or preference, preferably arranged in a sorted list for selection of one or more entries. Each event is, preferably, associated with a plurality of weighted event attributes types and values of event attribute subtypes. Similarly, each user profile comprises a plurality of weighted profile attributes (such as those organized into vectors and matrices). These allow for generation of a similarity score based on shared attributes and their respective weights in arriving at a list of events matched to the user profile or vice versa. Advantageously, the profile attributes may be standardized using the available data in the various databases, such as the event and the profile databases, to improve the comparison between profiles and event attributes.

In another aspect, the present invention includes a stand-alone service for assisting a user to locate stores, directions to such stores and browse various products and services. The service is configured to receive a request from a client device (e.g., a thin client on a cell phone), and retrieve a record comprising an identifier of a second server system that is better suited to provide content from the specified location (e.g., a sale at a specified store in a mall). Moreover, the service may be further configured for one or more of adding, deleting, and updating of store sale records, retrieving a map from a map server, or a record based on request location criterion and a user profile. The user profile may include personalization information, which may be useful in providing personalized information about services available in a geographic area of interest.

In another aspect, the present invention also encompasses a communication system comprising a server system, for instance, the miAware™ system of Mapinfo® Corporation, that is configured to provide a location and an ordered list of events matched to a user profile to a client device (e.g., a cell phone). Each event in the list of events is associated with weighted event attributes types and values of event attribute subtypes, and the user profile is associated with weighted profile attributes, which are used to compute a similarity score.

The profile attributes may be standardized using statistics (such as a mean and a standard deviation) of the profile attributes in a database having a plurality of user profiles, and, similarly, the event attributes may be standardized using statistics based on the event attributes in an event database. Then, the similarity scores between events in a database and a specified user profile may be calculated by summing, over the events in the database, the square of the differences between standardized event attributes and corresponding standardized specified user profile attributes, or, alternatively, by summing, over substantially all users in the database, the square of the differences between standardized user profile attributes and corresponding standardized specified event attributes.

It should be noted that the processing described in the context of matching events and user profiles is also applicable to matching services like advertisements and promotions to users.

In another aspect, the present invention includes a method for providing location based services. The method may be illustratively be described as comprising the steps of receiving a request for a service in a message encoded in a markup language (XML) at the service manager; optionally authenticating the request; determining whether the service is available at a plurality of service modules registered with the service manager (by accessing the catalog of services); forwarding an error message in response to determining that the service is not available at the plurality of service modules; forwarding the request to a service module (the request object) in response to determining that the service is available; and sending a result received from the service module (the response object) to a client device (as an XML encoded response).

In addition to the steps listed above, the client device sending the request may have a different address than the address of the client device receiving the result, or, alternatively, the client device (e.g., browser on a cell phone) is redirected to another server (the local-content server).

A method for providing location based information in accordance with the invention includes receiving a request that also comprises information identifying a user and a location (e.g., the cell phone location) to enable retrieval of the user profile and one of more records based on said request and a location criterion. Furthermore, the local-server content server located in this manner may provide additional details such as information about sales, promotions, availability of a product or service, alternative sellers of a specified product close to the location, or alternative providers of a specified service close to the location.

In another aspect, the present invention includes a method for providing a list of events matched to a user profile comprising comparing a user profile (e.g., via the miAware™ system or a standalone system) with a database of events with the aid of profile attributes from the user profile and event attributes; generating similarity scores for events corresponding to the user profile; ordering the list of events according to one or more of a location criterion, a specification (e.g., a personal preference), and the smiliarity scores; and providing at least an ordered subset of the list of events to the user.

In addition, for each event, the event is assigned a weight with respect to each attribute type and a value for an attribute subtype (may be considered to be an event matrix). The user profile includes values for the profile attributes (a profile vector), wherein one or more of the event types and profile attributes are weighted to reflect their relative significance. The similarity scores between events in the database and the user profile are calculated by summing, over substantially all events in the database the square of the differences between standardized event attributes and corresponding standardized user profile attributes (this corresponds to $Score(I,j)=\Sigma (ZS(I,k)-ZE(j,k))^2$).

The described method is suitable for not only for determining matched events, but also for providing a list of users matched to an event (e.g., useful for determining whether the demographics are favorable for staging a proposed event, targeting an enriched audience with advertising, and the like). This may include comparing an event with a database of user profiles with the aid of profile attributes from the user profiles and event attributes; and generating a list of users with their corresponding similarity scores. The list of users may be ordered according to a location criterion, a specification, or the similarity scores.

In another aspect, the present invention includes design of a suitable thin client by a module for constructing service requests aided by helper classes to construct and submit service requests to the service manger. The module is implemented with no dependence on core server software to make it independent of the server and incorporates a parser to process responses received from the service manager.

It should be noted that the described embodiments are illustrative only and should not be understood as limiting the scope of the invention. The invention, as will be apparent to one of ordinary skill in the art, admits of many variations which are intended to be covered by the description herein and the attached claims. It should be so understood and interpreted.

The invention claimed is:

1. An integrated system for providing geographical locations based services to clients, the system comprising:
   a networked routing manager module for receiving a request from a client;
   a plurality of response modules registered with the routing manager for receiving one or more types of service requests, the service requests including obtaining one or more records containing a geocode corresponding to an address, an address corresponding to a geocode; a route to a destination, a position for a mobile device, identity of a location, one or more geographic features near a location; and a person profile data;
   a plurality of spatial servers in communication with one or more of said plurality of response modules to provide spatial information and to allow said plurality of response modules to communicate with one another; and
   an interface for adding response modules, the interface registering an added response module to the plurality of response modules registered with the routing manager,
   wherein the routing manager forwards the received request to at least two of said plurality of response modules, said at least two of said plurality of response modules communicate with one another regarding the received request and receive spatial information from at least one of said plurality of spatial servers in response to said request, and one of said at least two of said plurality of response modules generates and sends a response corresponding to the request to said routing manager to be forwarded to the client.

2. The system of claim 1, further comprising response modules for mapping, coordinate geometry service for carrying out geometric calculations and measurements, coordinate transformations, providing traffic related information, generating entelrrise specific maps; and providing an enterprise profile.

3. The system of claim 1, wherein at least one of the request and the response is encoded in a markup language.

4. The system of claim 1 further comprising one or more third party servers in communication with one or more of the response modules from the plurality of response modules, wherein the one or more response modules receive requested third party information.

5. The system of claim 1, wherein each of the plurality of response modules has a unique name for registering a service with the routing manager.

6. The system of claim 5, wherein each of the response modules presents at least one interface for interacting with the routing manager whereby the routing manager initializes or closes a selected response module, parses and publishes a request document, and handles results of a received request.

7. The system of claim 1, wherein the request received by the routing manager from a first network address results in the response being directed to a second network address.

8. The system of claim 1, wherein the response containing nearest geographic features includes an instruction or a link for accessing a network address corresponding to at least one geographic feature.

9. The system of claim 8, wherein the at least one geographic feature is an address of a location-based-information-system server associated with a user location, and the location-based-information-system server also provides personalization data as part of the person profile service.

10. The system of claim 9, wherein the location-based-information-system server also provides links to one or more local servers, associated with the user location, corresponding to input profile data or a user profile.

11. The system of claim 9 wherein the location-based-information-system server redirects a user to a first local server, or provides a choice of local servers.

12. The system of claim 11, wherein the first local server has additional user profile information.

13. The system of claim 11, wherein the first local server provides information about one or more of sales, promotions, availability of a product or service, alternative sellers of a specified product close to the user location, or alternative providers of a specified service close to the user location.

14. The system of claim 9 further comprising a user interface responsive to one or more taps or strokes on a pad, one or more clicks of an input device, or a voice command.

15. A user interface for navigating through a plurality of location based services to accumulate data for a task requiring results from two or more services, said interface comprising:
   a system for providing geographical locations based services to clients comprising:
      a networked routing manager module for receiving a request from a client;
      a plurality of response modules registered with the routing manager for receiving one or more types of service requests, the service requests including obtaining one or more records containing a geocode corresponding to an address, an address corresponding to a geocode; a route to a destination, a position for a mobile device, identity of a location, one or more geographic features near a location, and person profile data;
      a plurality of spatial servers in communication with one or more of said plurality of response modules to provide spatial information and to allow said plurality of response modules to communicate with one another; and
      a first interface for adding response modules, the first interface registering an added response module to the plurality of response modules registered with the routing manager,
      wherein the routing manager forwards the received request to at least two of said plurality of response modules, said at least two of said plurality of response modules communicate with one another regarding the received request and receive spatial information from at least one of said plurality of spatial servers in response to said request, and one of said at least two of said plurality of response modules generates and sends a response corresponding to the request to said routing manager to be forward to the client, the response contains nearest geographic features including an instruction or a link for accessing a network address corresponding to at least one geographic feature, the at least one geographic feature is an address of a location-based-information-system server associated with a user location, and the location-based-information-system server also provides personalization data as part of the person profile service, and the first local server provides information about one or more of sales, promotions, availability of a product or service, alternative sellers of a specified product close to the user location, or alternative providers of a specified service close to the user location.

16. The user interface of claim 15, further comprising navigation through sales, promotions, products, services, or events associated with a user profile or preference, the navigation being via one or more of choosing a location from a sorted list, selecting one or more entries corresponding to products or services, and requesting/receiving directions to a selected location.

17. The user interface of claim 16, further comprising functionality for navigation backwards to visit a previously presented screen.

18. The user interface of claim 16, wherein one or more of the sales, promotions, products, services, or events are presented to the user as a sorted list.

19. The user interface of claim 18, wherein the sorted list is based on one or more of attribute values matching with the user profile or preference.

20. The user interface of claim 18, wherein each of said events presented to the user is associated with values of a plurality of event attributes, and each user profile comprises values of a plurality of profile attributes, wherein one or more of the event and profile attributes are weighted to reflect their relative significance followed by the generation of a similarity score based on shared attributes and their respective weights.

21. The user interface of claim 20, wherein the profile attributes are standardized, based on their distribution in a reference database.

* * * * *